United States Patent
Shimoshikiryoh et al.

(10) Patent No.: US 10,670,923 B2
(45) Date of Patent: Jun. 2, 2020

(54) LIQUID CRYSTAL DISPLAY PANEL

(71) Applicant: SHARP KABUSHIKI KAISHA, Sakai, Osaka (JP)

(72) Inventors: Fumikazu Shimoshikiryoh, Sakai (JP); Toshinori Sugihara, Sakai (JP); Takehisa Yoshida, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 76 days.

(21) Appl. No.: 15/772,048

(22) PCT Filed: Oct. 24, 2016

(86) PCT No.: PCT/JP2016/081380
§ 371 (c)(1),
(2) Date: Apr. 28, 2018

(87) PCT Pub. No.: WO2017/073496
PCT Pub. Date: May 4, 2017

(65) Prior Publication Data
US 2018/0314114 A1 Nov. 1, 2018

(30) Foreign Application Priority Data
Oct. 30, 2015 (JP) .................................. 2015-214796

(51) Int. Cl.
G02F 1/1337 (2006.01)
G02F 1/1343 (2006.01)

(52) U.S. Cl.
CPC .. *G02F 1/133753* (2013.01); *G02F 1/133707* (2013.01); *G02F 1/134309* (2013.01);
(Continued)

(58) Field of Classification Search
CPC ... G02F 1/133753; G02F 2001/133757; G02F 1/133707; G02F 1/134309; G02F 2001/134345; G02F 2201/123
See application file for complete search history.

(56) References Cited

U.S. PATENT DOCUMENTS

| 2003/0071952 A1 | 4/2003 | Yoshida et al. |
| 2007/0159585 A1 | 7/2007 | Yoshida et al. |

(Continued)

FOREIGN PATENT DOCUMENTS

| JP | 2010-244081 A | 10/2010 |
| JP | 2011-085738 A | 4/2011 |

(Continued)

*Primary Examiner* — Jia X Pan
(74) *Attorney, Agent, or Firm* — ScienBiziP, P.C.

(57) ABSTRACT

A liquid crystal display panel includes in the following order: a first substrate including pixel electrodes; a liquid crystal layer; and a second substrate including a counter electrode. The liquid crystal display panel includes pixels each including at least four alignment regions that provide different tilt azimuths to the liquid crystal molecules. The four alignment regions are arranged in a longitudinal direction of the pixels. The pixel electrodes are each provided with linear slits. The slits are formed in a region between one pixel edge of each pixel in the longitudinal direction and a center line of the pixel in the transverse direction in each alignment region. The liquid crystal molecules are aligned in a direction substantially perpendicular to the first substrate and the second substrate and at a tilt in the respective tilt azimuth directions with no voltage applied to the liquid crystal layer. The liquid crystal molecules are at a twist angle of substantially 45° or smaller. Upon application of voltage to the liquid crystal layer, the liquid crystal molecules are to be more tilted in the respective tilt azimuth directions and the tilt azimuth of each liquid crystal molecule is a given azimuth in each region in which the slits are formed.

19 Claims, 14 Drawing Sheets

(52) U.S. Cl.
CPC ......... *G02F 2001/133757* (2013.01); *G02F 2201/123* (2013.01)

(56) References Cited

U.S. PATENT DOCUMENTS

| | | |
|---|---|---|
| 2009/0284703 A1 | 11/2009 | Shoraku et al. |
| 2011/0261297 A1 | 10/2011 | Yoshida et al. |
| 2012/0002144 A1 | 1/2012 | Shoraku et al. |
| 2013/0010221 A1 | 1/2013 | Yoshida et al. |
| 2013/0114029 A1 | 5/2013 | Shoraku et al. |
| 2015/0036073 A1 | 2/2015 | Im et al. |

FOREIGN PATENT DOCUMENTS

| | | |
|---|---|---|
| JP | 5184618 B | 4/2013 |
| JP | 2015-031961 A | 2/2015 |

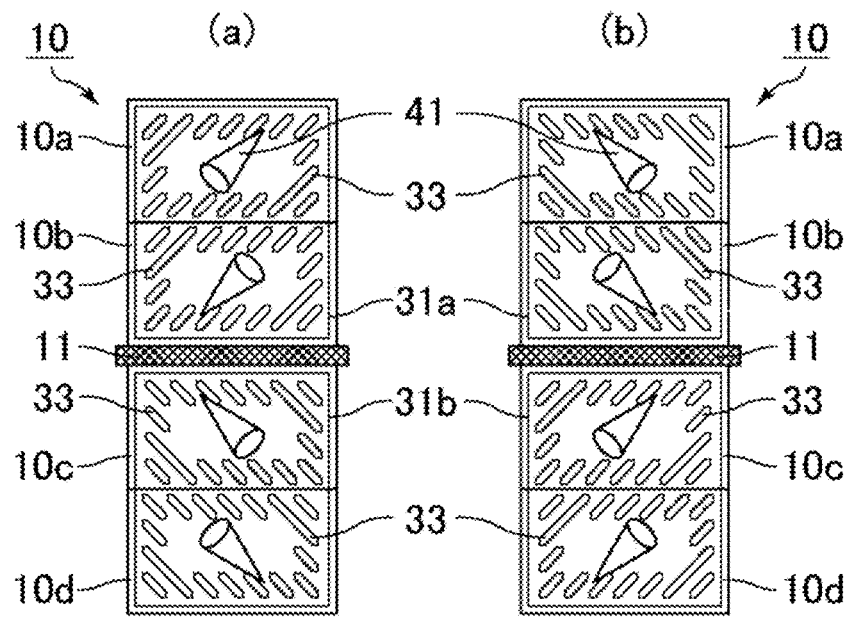
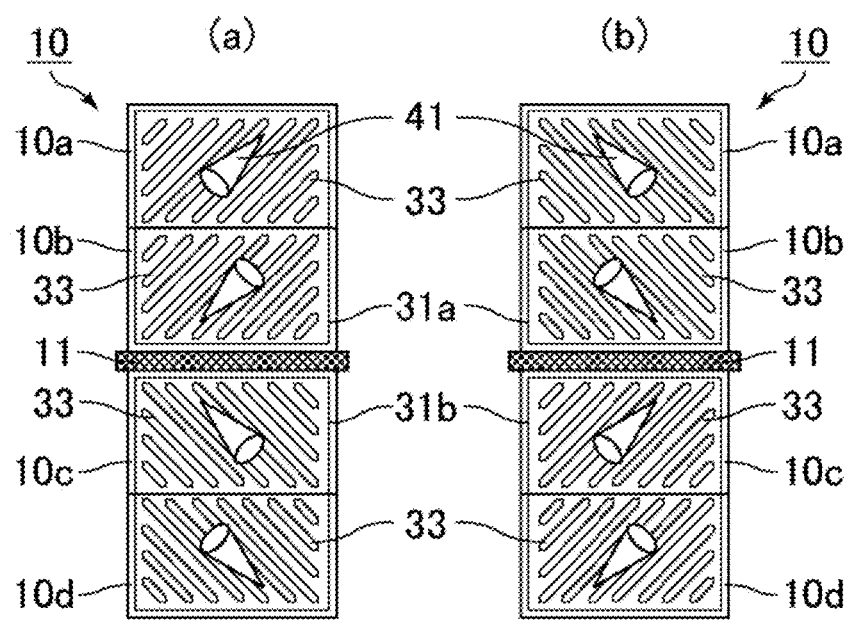

Fig. 12

| | Example 1 | Example 2 | Comparative Example 1 |
|---|---|---|---|
| Photograph of simulation result | | | |
| Transmittance — With CS-connecting line | 122% | 130% | 100% |
| Transmittance — Without CS-connecting line | 126% | 134% | 100% |

PRIOR ART

RELATED ART

LIQUID CRYSTAL DISPLAY PANEL

TECHNICAL FIELD

The present invention relates to liquid crystal display panels. More specifically, the present invention relates to a liquid crystal display panel including regions providing different tilt azimuths to liquid crystal molecules.

BACKGROUND ART

Liquid crystal display devices utilize a liquid crystal composition to provide display. A typical display method for such devices irradiates a liquid crystal display panel including a liquid crystal composition enclosed between paired substrates with light from the backlight and applies voltage to the liquid crystal composition to change the alignment of liquid crystal molecules, thereby controlling the amount of light passing through the liquid crystal display panel. Such liquid crystal display devices have a thin profile, light weight, and low power consumption, and are therefore utilized in electronic products such as smartphones, tablet PCs, and automotive navigation systems.

Alignment division techniques have been studied which divide one pixel into multiple alignment regions (domains) to align the liquid crystal molecules at different azimuths in different alignment regions such that the viewing angle characteristics are enhanced. The alignment of a pixel can be divided by, for example, a method that divides a half-pixel into four alignment regions of two rows by two columns. Examples of such an alignment mode include 4 domain-reverse twisted nematic (4D-RTN) mode (e.g., Patent Literature 1, Patent Literature 2).

Patent Literature 1 discloses improvement of the display quality by a light-shielding film at positions where alignment disorder of liquid crystal molecules occurs. Patent Literature 1 also mentions division of the alignment in one pixel into four rows by one column as a technique to produce a 4D-RTN mode liquid crystal display panel. Patent Literature 2 suggests a technique of increasing the transmittance of a 4D-RTN mode liquid crystal display panel using an electrode configuration including a main part and multiple branches extending parallel to each other from the main part.

CITATION LIST

Patent Literature

Patent Literature 1: JP 5184618 B
Patent Literature 2: JP 2011-85738 A

SUMMARY OF INVENTION

Technical Problem

At borders of regions providing different alignment azimuths to liquid crystal molecules, the alignment of liquid crystal molecules is irregular. In provision of liquid crystal display, the regions with irregular alignment of liquid crystal molecules do not transmit light and are therefore observed as dark lines, decreasing the transmittance (contrast ratio) and deteriorating the response performance. For this reason, in the case of dividing one pixel into multiple alignment regions, increasing the number of alignment regions formed in each alignment region enhances the viewing angle characteristics, but also unfortunately increases the number of regions with irregular alignment of liquid crystal molecules, whereby the number of regions observed as dark lines tends to increase.

FIG. 15 shows schematic plan views of a half pixel schematically showing a conventional 4D-RTN mode liquid crystal display panel 300 with voltage applied. FIG. 15(a) is a schematic plan view of a TFT substrate. FIG. 15(b) is a schematic plan view of a CF substrate. FIG. 15(c) is a schematic plan view after the TFT substrate and the CF substrate are bonded to each other. The white arrows in FIG. 15(a) indicate pre-tilt azimuths 353 of liquid crystal molecules relative to the TFT substrate. The black arrows in FIG. 15(b) indicate the pre-tilt azimuths 353 of liquid crystal molecules relative to the CF substrate. As shown in FIG. 15(c), the liquid crystal display panel 300 includes, in a half pixel, four alignment regions of two rows by two columns providing different tilt azimuths to liquid crystal molecules 341. In the liquid crystal display panel 300, dark lines 320 appearing as a fylfot cross are generated. For example, the proportion of regions with regularly aligned liquid crystal molecules, i.e., regions other than dark lines, is low as in the case where, for example, one pixel has a size of 82 μm in width and 245 μm in length and the width of the dark line 320 is about 10 μm.

In regions where the alignment of liquid crystal molecules is irregular, the response performance of the liquid crystal molecules is low. This may cause a white tailing phenomenon (phenomenon in which a line which looks like a white tail is observed) and a black tailing phenomenon (phenomenon in which a line which looks like a black tail is observed). A white tailing phenomenon may be observed when, for example, a black rectangular image moving from one side to the other side of the display screen of a liquid crystal display device is provided on the display screen with an intermediate grayscale background. This is because the luminance of the region opposite to the moving direction of the black rectangular image may be higher than that of the intermediate grayscale background. As with the case of the white tailing phenomenon, a black tailing phenomenon may be observed when, for example, a moving black rectangular image is provided on the liquid crystal display device with an intermediate grayscale background. This is because the luminance of the region opposite to the moving direction of the black rectangular image may be lower than that of the intermediate grayscale background.

FIG. 16 shows schematic plan views of a half pixel schematically showing another conventional 4D-RTN mode liquid crystal display panel 400 with voltage applied. FIG. 16(a) is a schematic plan view of a TFT substrate. FIG. 16(b) is a schematic plan view of a CF substrate. FIG. 16(c) is a schematic plan view after the TFT substrate and the CF substrate are bonded to each other. The white arrows in FIG. 16(a) indicate pre-tilt azimuths 453 of liquid crystal molecules relative to the TFT substrate. The black arrows in FIG. 16(b) indicate the pre-tilt azimuths 453 of liquid crystal molecules relative to the CF substrate. As shown in FIG. 16(c), the liquid crystal display panel 400 includes, in a half pixel, four alignment regions of two rows by two columns providing different tilt azimuths to liquid crystal molecules 441. The liquid crystal display panel 400 reduces alignment disorder of the liquid crystal molecules by utilizing the electrode configuration of a pixel electrode. This reduces regions with irregular alignment of the liquid crystal molecules 441 and can thereby reduce a response function decrease, so that a white tailing phenomenon is presumed to be less observed. This configuration can reduce the width of the dark lines, but produces dark lines 420 appearing as a cross shape.

The studies made by the present inventors have also revealed that in the 4D-RTN mode liquid crystal display panel 400 having an electrode configuration as shown in FIG. 16(c), the liquid crystal molecules 441 in each alignment region are aligned by electric fields generated by slits 433 formed in the pixel electrode 431 when voltage is applied. Here, the rotation directions for the liquid crystal molecules 441 by the electric fields are different from the pre-tilt azimuths 453 of the liquid crystal molecules. Thus, pushing the display screen of the liquid crystal display panel 400 with a finger, for example, may disturb the alignment of the liquid crystal molecules 441, leaving a mark of pushing with a finger even after the removal of the finger. Also in a 4D-RTN mode liquid crystal display panel including alignment regions of four rows by one column in one pixel, the liquid crystal molecules are twist-aligned due to the different pre-tilt azimuths of liquid crystal molecules relative to the TFT substrate and the CF substrate. With this configuration, in the case where each pixel electrode is provided with slits, a mark is found to be left by pushing with a finger as described above.

The recent increase in definition of pixels requires reduction in area per pixel. The area of dark lines, however, remains the same even when the size of pixels is reduced, and thus the proportion of the area of dark lines in a pixel increases. Hence, more studies are needed to achieve favorable viewing' angle characteristics and a high transmittance and to reduce generation of marks left by pushing with a finger while responding to the increase in definition.

The present invention has been made in view of the above current state of the art, and aims to provide a liquid crystal display panel having a high transmittance and reducing generation of dark lines and generation of marks left by pushing with a finger.

Solution to Problem

The present inventors have made studies on the method for dividing a pixel in a liquid crystal display panel into multiple alignment regions while reducing generation of dark lines. Based on the studies, the present inventors have found that the viewing angle characteristics can be achieved by dividing a pixel into four alignment regions providing different tilt azimuths to liquid crystal molecules. The inventors have also found a new alignment control mode that can reduce generation of dark lines while responding to the increase in the definition. In the new alignment control mode, liquid crystal molecules are at a twist angle of 45° or smaller in each of the four alignment regions in a plan view of the liquid crystal display panel, and the four alignment regions are arranged in the longitudinal direction of the pixels.

The inventors have focused on forming linear slits in each pixel electrode in order to further increase the transmittance of the liquid crystal display panel. As a result, the inventors have found that generation of marks left by pushing with a finger can be reduced even in the case where the pixel electrodes are provided with slits as long as liquid crystal molecules are at a twist angle of substantially 45° or smaller in each of the four alignment regions in a plan view of the liquid crystal display panel. Furthermore, the liquid crystal display panel was found to exhibit effectively reduced generation of dark lines and an even higher transmittance with the following configuration. That is, the slits are formed in a region between one pixel edge of each pixel in the longitudinal direction and a center line of the pixel in the transverse direction in each of the four alignment regions, and the tilt azimuth of each liquid crystal molecule, extending in a direction from an end of the long axis of the liquid crystal molecule near the pixel electrodes to an end of the long axis near the counter electrode, forms an angle greater than 90° with an azimuth that is perpendicular to the longitudinal direction of the pixels and extends from exterior to interior of each pixel. The inventors have thereby solved the above problems, arriving at the present invention.

In other words, one aspect of the present invention may be a liquid crystal display panel including in the following order: a first substrate including pixel electrodes; a liquid crystal layer containing liquid crystal molecules; and a second substrate including a counter electrode, the liquid crystal display panel including pixels each including at least four alignment regions of a first alignment region, a second alignment region, a third alignment region, and a fourth alignment region that provide different tilt azimuths to the liquid crystal molecules, the four alignment regions being arranged in a longitudinal direction of the pixels, the pixel electrodes being arranged in the respective pixels and each provided with linear slits formed to be superimposed on at least one of the four alignment regions, the slits being formed in a region between one pixel edge of each pixel in the longitudinal direction and a center line of the pixel in the transverse direction in each alignment region, the liquid crystal molecules being aligned in a direction substantially perpendicular to the first substrate and the second substrate and at a tilt in the respective tilt azimuth directions with no voltage applied to the liquid crystal layer, the liquid crystal molecules being at a twist angle of substantially 45° or smaller in each of the four alignment regions in a plan view of the liquid crystal display panel, upon application of voltage to the liquid crystal layer, the liquid crystal molecules being to be more tilted in the respective tilt azimuth directions and the tilt azimuth of each liquid crystal molecule, extending in a direction from an end of the long axis of the liquid crystal molecule near the pixel electrodes to an end of the long axis near the counter electrode, forming an angle greater than 90° with an azimuth that is perpendicular to the longitudinal direction of the pixels and extends from exterior to interior of each pixel, in each region in which the slits are formed. The "azimuth" as used herein means a direction in a view projected on a substrate surface without consideration of the tilt angle (i.e., polar angle, pre-tilt angle) from the normal direction of the substrate surface. For example, if an x-axis and a y-axis perpendicular to the x-axis form an xy plane parallel to the substrate surfaces and the x-axis direction is defined as 0°, the azimuth is determined counterclockwise in a positive value. The "tilt azimuth" as used herein means an azimuth at which liquid crystal molecules tilt relative to the first substrate.

Advantageous Effects of Invention

The liquid crystal display panel of the present invention can exhibit reduced generation of dark lines and an increased transmittance because it includes four alignment regions providing different tilt azimuths to liquid crystal molecules in one pixel and the tilt azimuths of the liquid crystal molecules are different among the alignment regions. Also, the liquid crystal display panel can reduce generation of dark lines owing to the slits formed in each pixel electrode, and can reduce generation of marks left by pushing with a finger owing to liquid crystal molecules aligned at a twist angle of substantially 45° or smaller.

BRIEF DESCRIPTION OF DRAWINGS

FIG. 8 shows schematic plan views of one pixel in a liquid crystal display panel of Modified Embodiment 2.
FIG. 9 shows schematic plan views of one pixel in a liquid crystal display panel of Modified Embodiment 3.
FIG. 12 is a table showing comparison of transmittance among liquid crystal display panels of Example 1, Example 2, and Comparative Example 1.

DESCRIPTION OF EMBODIMENTS

Hereinafter, embodiments of the present invention are described. The following embodiments, however, are not intended to limit the scope of the present invention, and appropriate modifications can be made within the spirit of the present invention.

Embodiment 1

Figure 1:
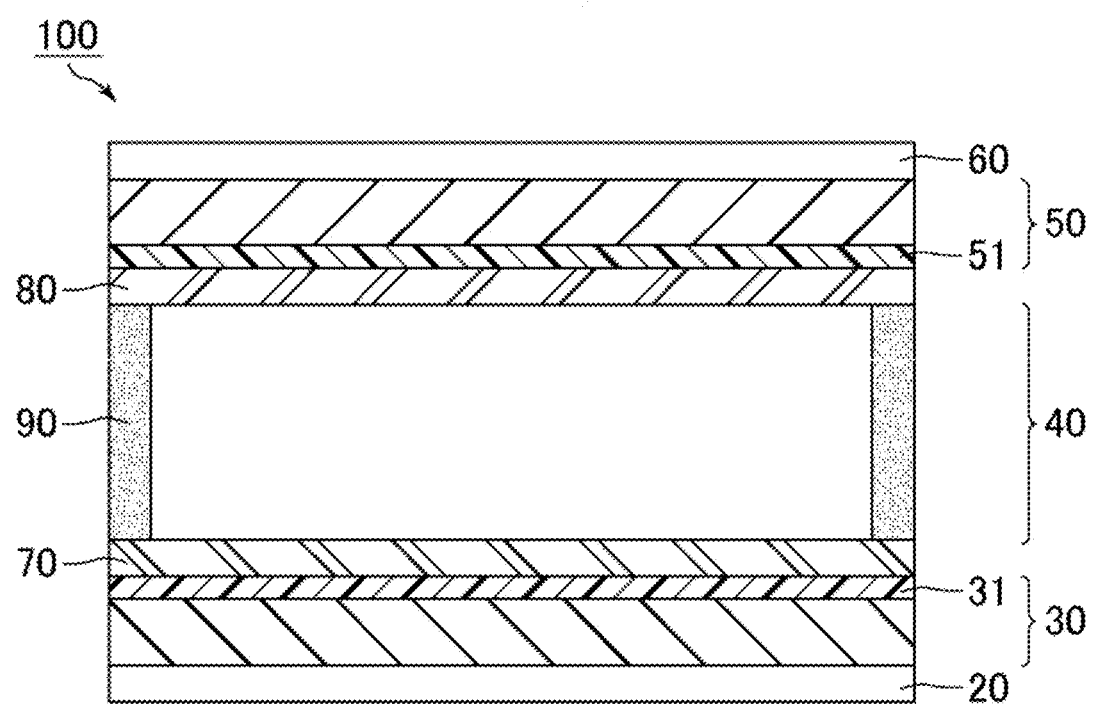
FIG. 1 is a cross-sectional view schematically showing a liquid crystal display panel of Embodiment 1.
Figure 2:
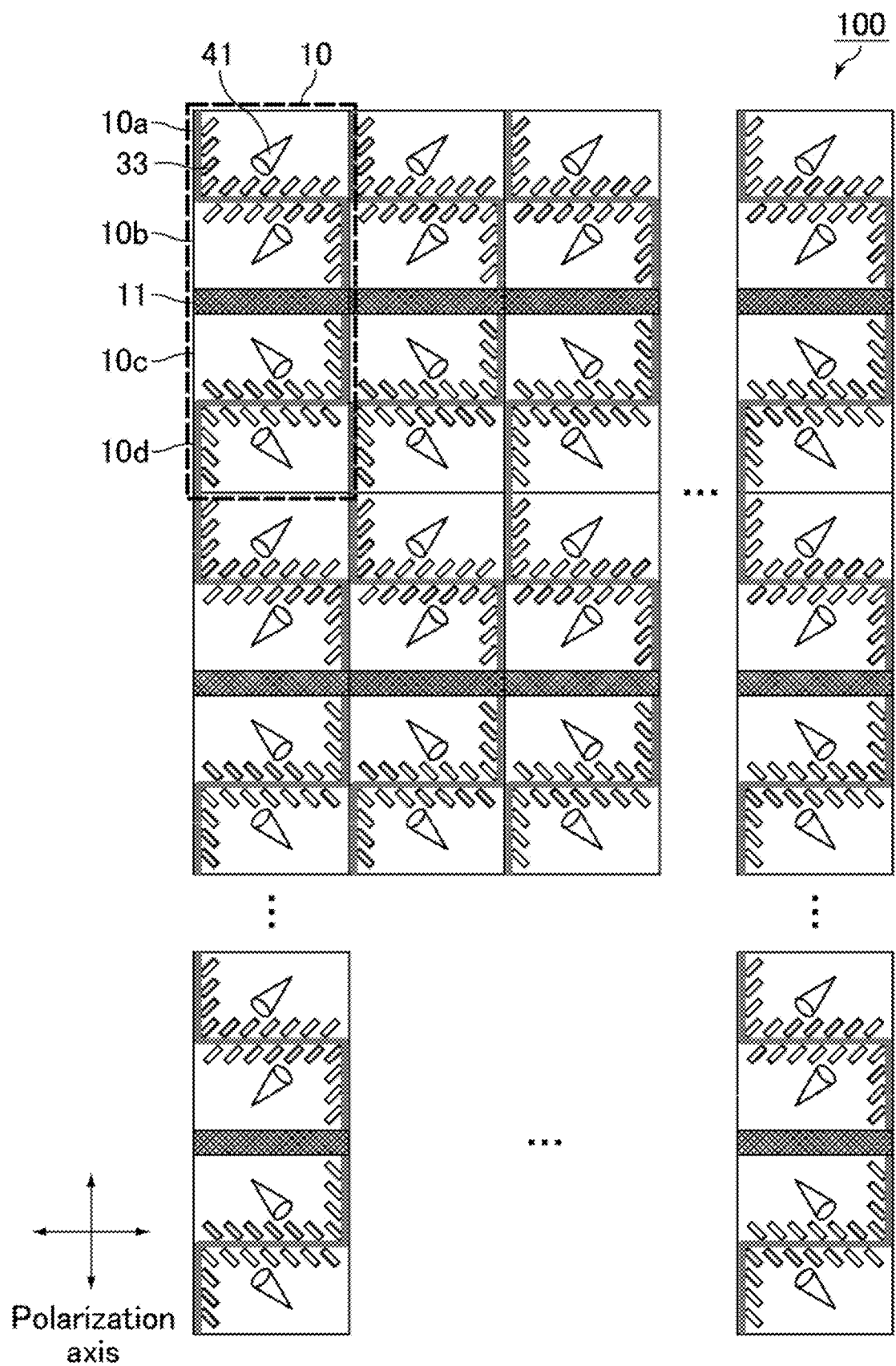
FIG. 2 is a plan view schematically showing the liquid crystal display panel of Embodiment 1.

A liquid crystal display panel of Embodiment 1 is described with reference to FIG. 1 to FIG. 6. FIG. 1 is a cross-sectional view schematically showing a liquid crystal display panel of Embodiment 1. FIG. 2 is a plan view schematically showing the liquid crystal display panel of Embodiment 1. As shown in FIG. 1, a liquid crystal display panel 100 of Embodiment 1 includes, in the following order, a first substrate 30 including pixel electrodes 31, a liquid crystal layer 40 containing liquid crystal molecules, and a second substrate 50 including a counter electrode 51. The liquid crystal layer 40 is surrounded by a sealing material 90. As shown in FIG. 2, the liquid crystal display panel 100 of Embodiment 1 includes pixels 10 arranged in a matrix. In the drawings, the liquid crystal molecules are depicted as cones whose base is oriented to the observer.

The first substrate 30 includes the pixel electrodes 31 and may be, for example, an active matrix substrate (TFT substrate). The TFT substrate can be one commonly used in the field of liquid crystal display panels. The first substrate 30 may further include signal lines 11 (e.g., gate signal lines) which may be arranged to cross the pixels 10 in the transverse direction. The TFT substrate may have a configuration including on a transparent substrate, in a plan view thereof, parallel source signal lines; parallel gate signal lines extending perpendicular to the source signal lines; active elements such as TFTs arranged at intersections of the source signal lines and the gate signal lines; and pixel electrodes 31 arranged in a matrix in regions defined by the source signal lines and the gate signal lines. The TFTs preferably include channels formed of an oxide semiconductor. The source signal lines and the gate signal lines can be those commonly used in the field of liquid crystal display panels, and can be formed of a metal such as titanium, chromium, aluminum, or molybdenum, or an alloy of these metals, for example. The oxide semiconductor may be, for example, a compound (In—Ga—Zn—O) formed of indium (In), gallium (Ga), zinc (Zn), and oxygen (O), a compound (In-Tin-Zn—O) formed of indium (In), tin (Tin), zinc (Zn), and oxygen (O), or a compound (In—Al—Zn—O) formed of indium (In), aluminum (Al), zinc (Zn), and oxygen (O).

Figure 3:
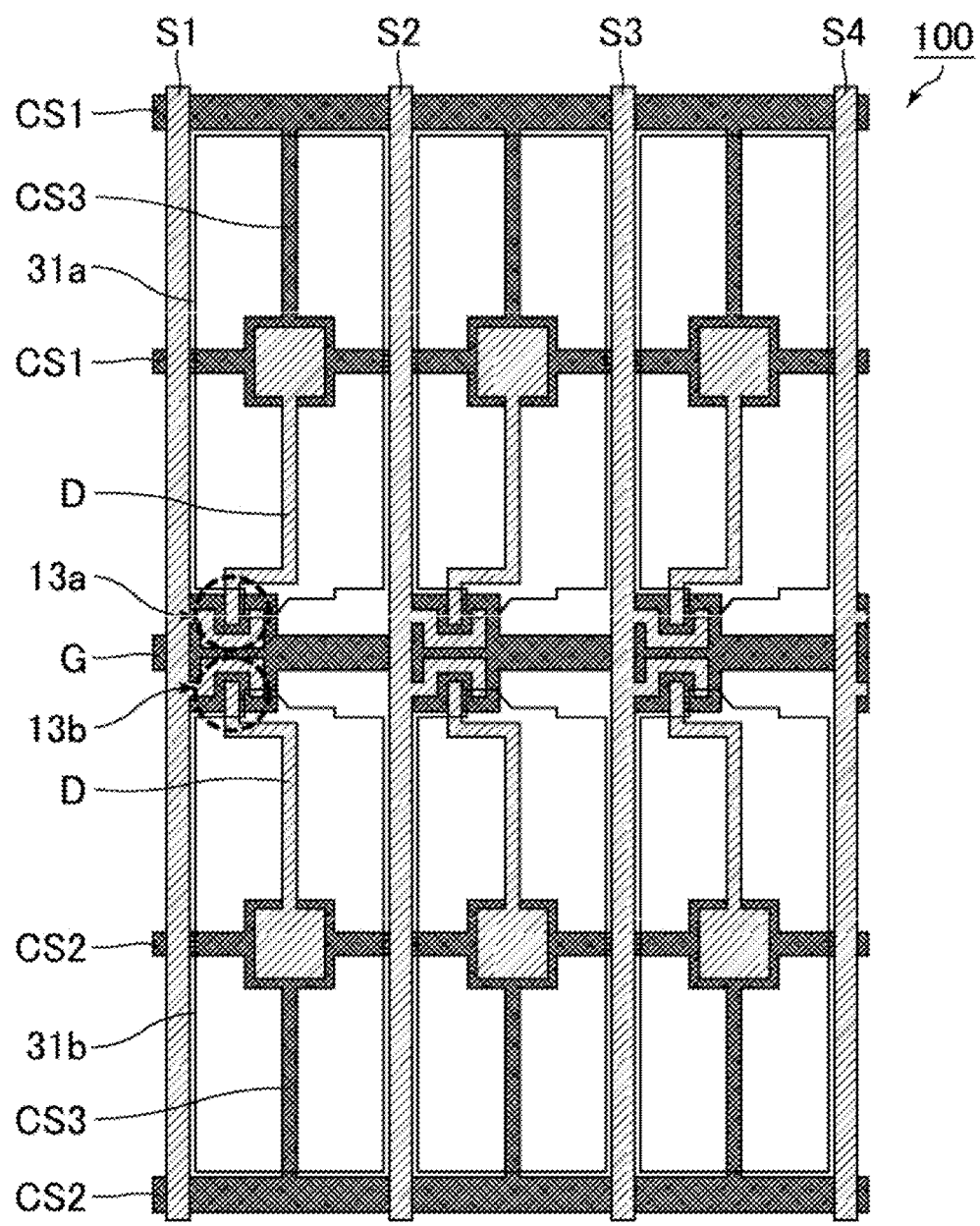
FIG. 3 is a plan view schematically showing an exemplary first substrate in the liquid crystal display panel of Embodiment 1.
Figure 4:
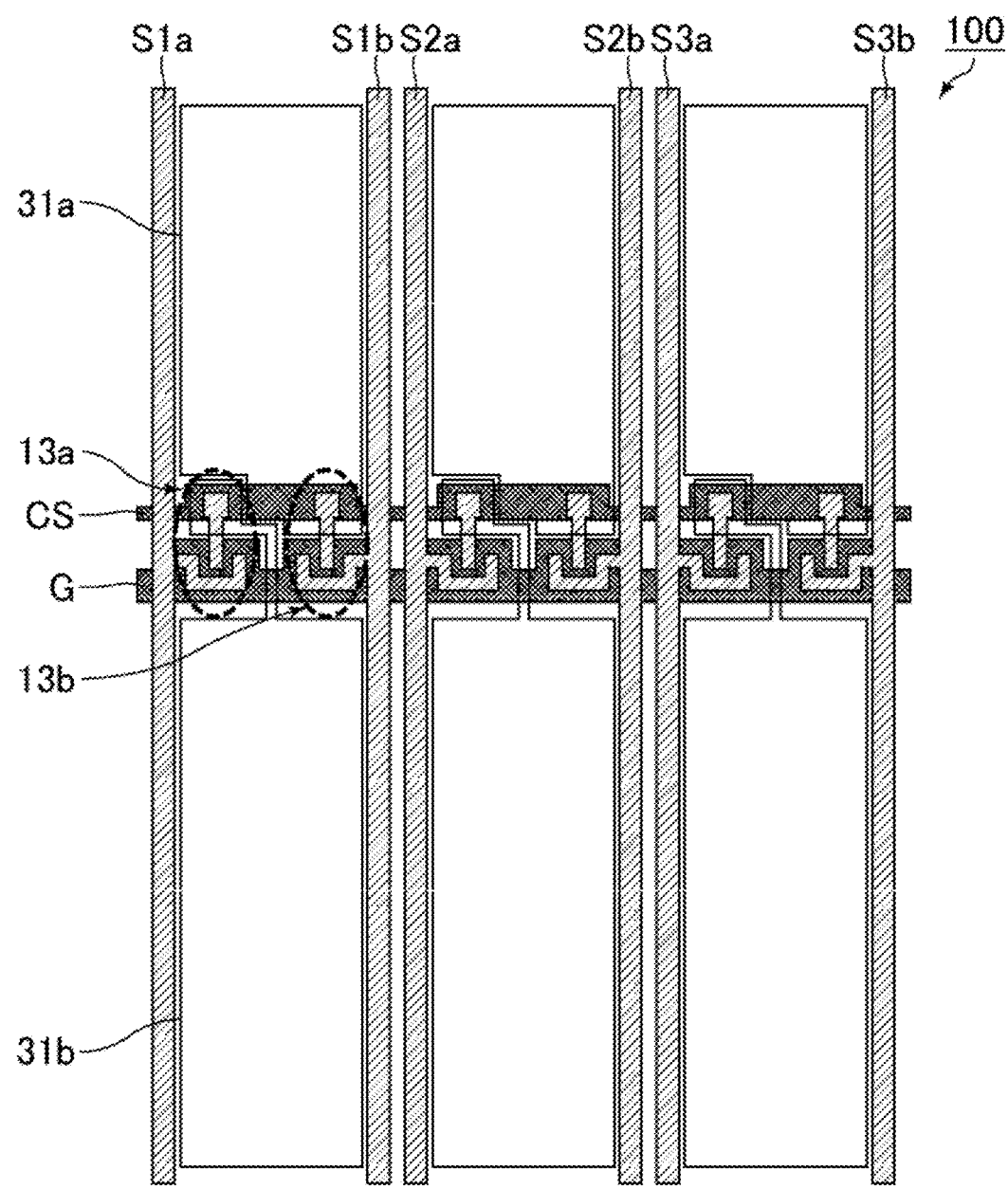
FIG. 4 is a plan view schematically showing another exemplary first substrate in the liquid crystal display panel of Embodiment 1.
Figure 5:
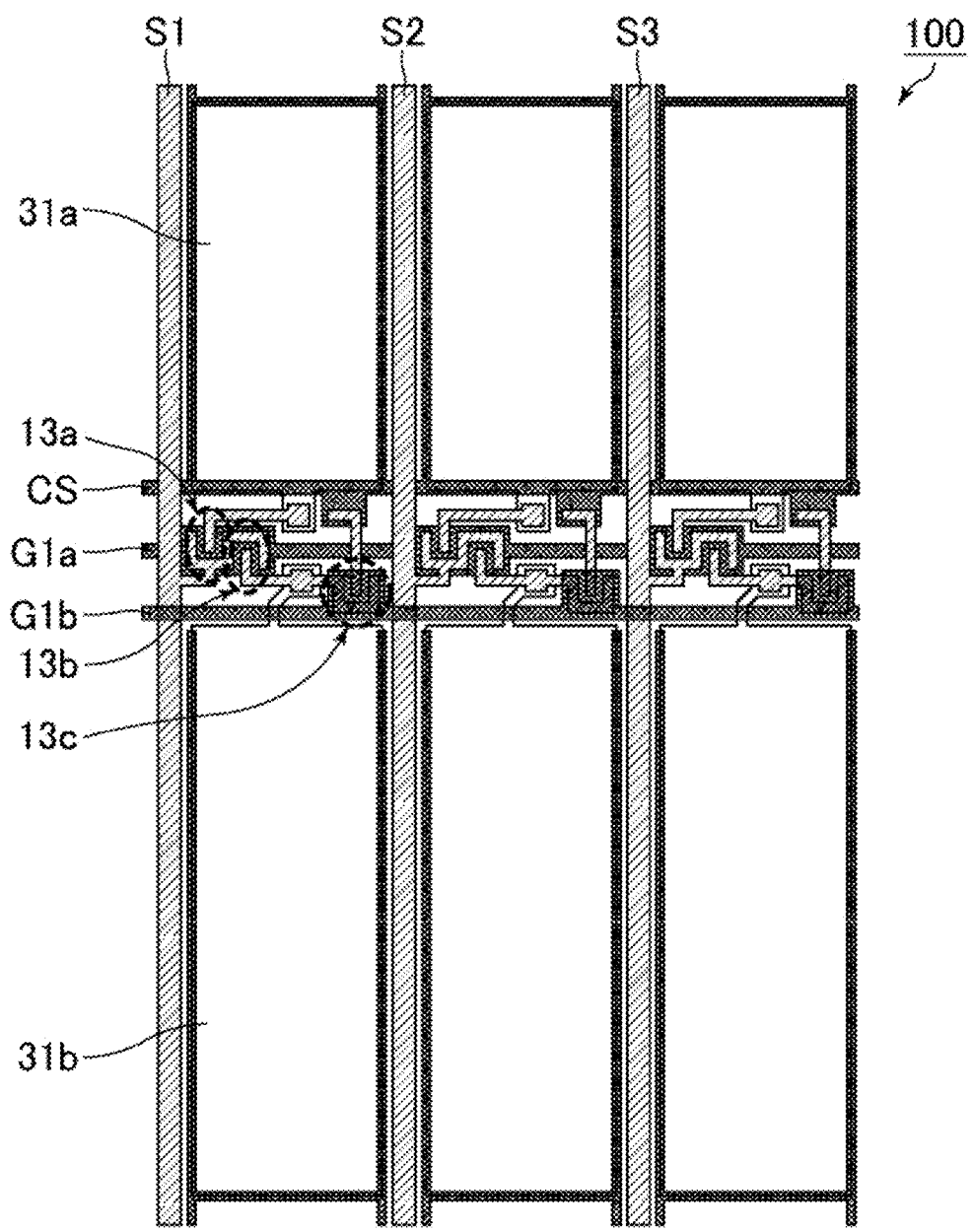
FIG. 5 is a plan view schematically showing yet another exemplary first substrate in the liquid crystal display panel of Embodiment 1.

FIG. 3 to FIG. 5 are plan views schematically showing exemplary first substrates in the liquid crystal display panel of Embodiment 1. As shown in FIG. 3 to FIG. 5, one pixel may include two alignment division parts, and a first pixel electrode 31a and a second pixel electrode 31b may receive signals via different TFTs. In FIG. 3 to FIG. 5, slits 33 are not illustrated.

As shown in FIG. 3, for example, one gate line G may be arranged to cross the center of each pixel in the transverse direction of the pixels, and source signal lines S1, S2, S3, and S4 may be arranged to be perpendicular to the gate signal line G. Capacitance lines CS1 and CS2 may be arranged parallel to the gate signal line G. The two TFTs 13a and 13b may be arranged at intersections of the gate signal line G and the source signal line CS1. A drain line D connected to the TFT 13a may be electrically connected to the first pixel electrode 31a when the TFT 13a is turned on, and a drain line D connected to the TFT 13b may be electrically connected to the second pixel electrode 31b when the TFT 13b is turned on. Furthermore, the capacitance line CS1 may be formed at a position where the drain line D connected to the TFT 13a is connected to the first pixel electrode 31a, while the capacitance line CS2 may be formed at a position where the drain line D connected to the TFT 13b is connected to the second pixel electrode 31b. The capacitance lines CS1 and CS2 are each preferably arranged to cross the center of the half pixel in the transverse direction of the pixel. Arrangement of the capacitance lines CS1 and CS2 to superimpose them on the borders of two adjacent alignment regions reduces the chances of dark line observation. The capacitance lines CS1 and CS2 may be connected to each other by a CS-connecting line CS3.

As shown in FIG. 4, for example, one gate signal line G may be arranged to cross the center of each pixel in the transverse direction of the pixels, and source signal lines S1a, S1b, S2a, S2b, S1a, and S1b may be arranged to be perpendicular to the gate signal line G. In other words, one gate signal line G and two source signal lines may be arranged in one pixel. A capacitance line CS may be arranged to be parallel to the gate signal line G. The TFT 13a may be arranged at an intersection of the gate signal line G and the source signal line S1a, and the TFT 13b may be arranged at an intersection of the gate signal line G and the source signal line S1b. A drain line connected to the TFT 13a may be electrically connected to the second pixel electrode 31b when the TFT 13a is turned on, and a drain line connected to the TFT 13b may be electrically connected to the first pixel electrode 31a when the TFT 13b is turned on. Furthermore, the capacitance line CS may be formed at a position where the drain line connected to the TFT 13a is connected to the second pixel electrode 31b and at a position where the drain line connected to the TFT 13b is connected to the first pixel electrode 31a.

As shown in FIG. 5, for example, two gate signal lines G1a and G1b may be arranged to cross the center of each pixel in the transverse direction of the pixels, and source signal lines S1, S2, and S3 may be arranged to be perpendicular to the gate signal lines G1a and G1b. Three TFTs 13a, 13b, and 13c may be arranged in one pixel. The TFT 13a and the TFT 13b may be arranged at an intersection of the gate signal line G1a and the source signal line S1. A drain line connected to the TFT 13a may be electrically connected to the first pixel electrode 31a when the TFT 13a is turned on, and a drain line connected to the TFT 13b may be electrically connected to the second pixel electrode 31b when the TFT 13b is turned on. Furthermore, the drain line connected to the TFT 13b may form a TFT 13c with the gate signal line G1b, and a drain line connected to the TFT 13c may be connected to the capacitance line CS.

The liquid crystal layer 40 contains liquid crystal molecules 41. The liquid crystal molecules 41 are aligned in the direction substantially perpendicular to the first substrate 30 and the second substrate 50 at a tilt in the respective tilt azimuth directions with no voltage applied to the liquid crystal layer 40 and are to be more tilted in the respective tilt azimuth directions upon application of voltage to the liquid crystal layer 40. Here, the liquid crystal display panel 100 can provide display when the liquid crystal molecules 41 are more tilted in the respective tilt azimuth directions.

Figure 6:
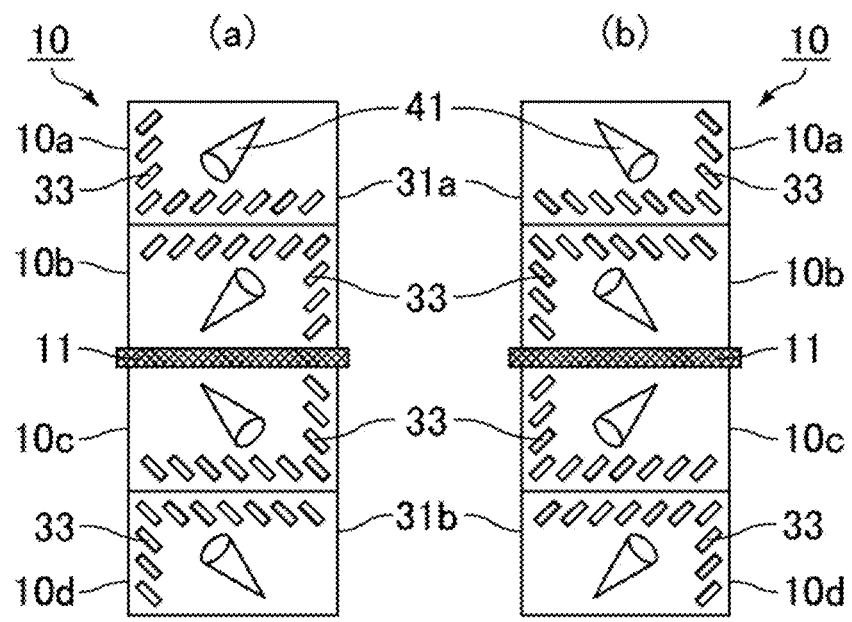
FIG. 6 shows schematic plan views of one pixel in the liquid crystal display panel of Embodiment 1.

FIG. 6 shows schematic plan views of one pixel in the liquid crystal display panel of Embodiment 1. The liquid crystal display panel 100 includes the pixels 10 each including at least four alignment regions of a first alignment region 10a, a second alignment region 10b, a third alignment region 10c, and a fourth alignment region 10d which provide different tilt azimuths to the liquid crystal molecules 41. The four alignment regions are arranged in the longitudinal direction of the pixels 10.

The first alignment region 10a, the second alignment region 10b, the third alignment region 10c, and the fourth alignment region 10d may each be any of an alignment region providing a tilt azimuth of substantially 45°, an alignment region providing a tilt azimuth of substantially 135°, an alignment region providing a tilt azimuth of substantially 225°, and an alignment region providing a tilt azimuth of substantially 315°, with the azimuth in a transverse direction of the pixels defined as 0°. The transmittance of the pixel 10 reaches the highest when the tilt azimuth of the liquid crystal molecules 41 forms an angle of 45° with the polarization axis of the polarizing plate. Hence, the transmittance can be made highest by setting the azimuth in the transverse direction of the pixel 10 and the polarization axis of one of the polarizing plates to be parallel to each other and providing tilt azimuths of 45°, 135°, 225°, and 315° to the liquid crystal molecules 41, with the azimuth in the transverse direction of the pixels 10 defined as 0°. The "tilt azimuths of substantially 45°, substantially 135°, substantially 225°, and substantially 315°" with the azimuth in the transverse direction of the pixels 10 defined as 0° refer to the ranges up to an angle of 15°, preferably an angle of 5°, from the 45°, 135°, 225°, and 315° points in the clockwise or counterclockwise direction, respectively, with the azimuth in the transverse direction of the pixels 10 defined as 0°.

The four alignment regions may include two alignment regions which provide tilt azimuths substantially 180° different from each other to the liquid crystal molecules 41 and are arranged next to each other. With two alignment regions which provide tilt azimuths substantially 180° different from each other to the liquid crystal molecules 41 and are arranged next to each other, the viewing angle characteristics can be made favorable. More preferably, the first substrate 30 may include the signal line 11 that crosses each pixel 10 in a transverse direction to divide the pixel 10 into two alignment division parts, and each pixel 10 may include two of the four alignment regions in at least one of the two alignment division parts formed by division with the signal line 11. In the two alignment regions included in the alignment division part, the tilt azimuths of the liquid crystal molecules 41 may be substantially 180° different from each other. The "substantially 180°" means the range up to an angle of 15°, preferably an angle of 5°, from the 180° point in the clockwise or counterclockwise direction.

For reduction of the number of dark lines and enhancement of the viewing angle characteristics, each pixel 10 preferably has a first alignment division pattern in which the first alignment region 10a providing a tilt azimuth of substantially 225°, the second alignment region 10b providing a tilt azimuth of substantially 45°, the third alignment region 10c providing a tilt azimuth of substantially 315°, and the fourth alignment region 10d providing a tilt azimuth of substantially 135° are arranged in the given order as shown in FIG. 6(a), or a second alignment division pattern in which the first alignment region 10a providing a tilt azimuth of substantially 315°, the second alignment region 10b providing a tilt azimuth of substantially 135°, the third alignment region 10c providing a tilt azimuth of substantially 225°, and the fourth alignment region 10d providing a tilt azimuth of substantially 45° are arranged in the given order as shown in FIG. 6(b). In the case where the alignment division pattern is the first alignment division pattern, the signal line 11 may be arranged between the second alignment region 10b providing a tilt azimuth of substantially 45° and the third alignment region 10c providing a tilt azimuth of substantially 315°. In the case where the alignment division pattern is the second alignment division pattern, the signal line 11 may be arranged between the second alignment region 10b providing a tilt azimuth of a substantially 135° and the third alignment region 10c providing a tilt azimuth of substantially 225°.

In the liquid crystal display panel of Embodiment 1, the pixels in the row direction and the column direction may consecutively have only the first alignment division pattern or may consecutively have only the second alignment division pattern. The pixels in the row direction may consecutively have the first alignment division pattern or the second alignment division pattern and the pixels in the column direction may alternately have the first alignment division pattern and the second alignment division pattern.

The liquid crystal molecules 41 are at a twist angle of substantially 45° or smaller in each of the four alignment regions in a plan view of the liquid crystal display panel 100 with no voltage applied to the liquid crystal layer 40. Preferably, the liquid crystal molecules 41 are at a twist angle of substantially 0° in each of the four alignment regions in a plan view of the liquid crystal display panel 100. The "substantially 0°" means the range up to an angle of 15°, preferably an angle of 5°, from the 0° point in the clockwise or counterclockwise direction. In other words, the liquid crystal molecules 41 near the center of the liquid crystal layer 40 in the thickness direction as well as the liquid crystal molecules near the first vertical alignment film 70 and near the second vertical alignment film 80 are at the same tilt azimuth.

The pixel electrodes 31 are arranged in the respective pixels 10. The pixel electrodes 31 may each include the first pixel electrode 31a configured to apply voltage to two alignment regions 10a and 10b arranged next to each other among the four alignment regions 10a, 10b, 10c, and 10d and the second pixel electrode 31b configured to apply voltage to the other two alignment regions 10c and 10d arranged next to each other, and the first pixel electrode 31a and the second pixel electrode 31b may be configured to apply different voltages to the liquid crystal layer 40.

The pixel electrodes 31 may each be a transparent electrode and can be formed of, for example, a transparent conductive material such as indium tin oxide (ITO), indium zinc oxide (IZO), zinc oxide (ZnO), or tin oxide (SnO), or an alloy thereof.

The pixel electrodes 31 are each provided with the linear slits 33 formed to be superimposed on at least one of the four alignment regions. The pixel electrodes 31 each provided with the slits 33 enable stabilization of the tilt azimuths of the liquid crystal molecules 41 with voltage applied and enable reduction of the width of dark lines generated. As described above, in the liquid crystal display panel 100, the liquid crystal molecules 41 are at a twist angle of substantially 45° or smaller in each of the four alignment regions in a plan view of the liquid crystal display panel 100 with no voltage applied to the liquid crystal layer 40, and the direction of rotation exerted to the liquid crystal molecules 41 by the electric fields generated by the pixel electrode provided with the slits 33 is substantially parallel to the tilt azimuths of the liquid crystal molecules 41 relative to the TFT substrate and the tilt azimuths of the liquid crystal molecules 41 relative to the CF substrate with no voltage applied. Accordingly, generation of marks left by pushing the liquid crystal display panel with a finger can be reduced even in the case where the pixel electrodes 31 are provided with slits.

Figure 16:
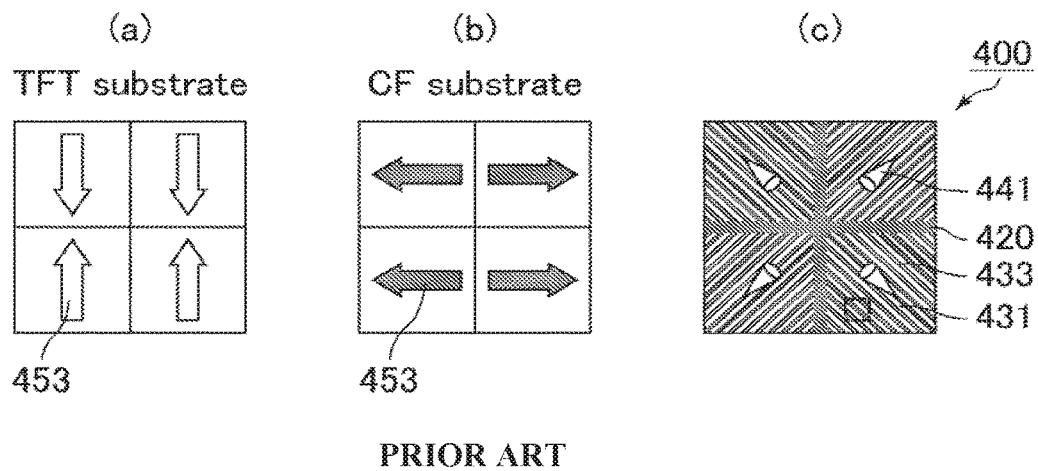
FIG. 16 shows schematic plan views of a half pixel in another conventional 4D-RTN mode liquid crystal display panel.
Figure 17:
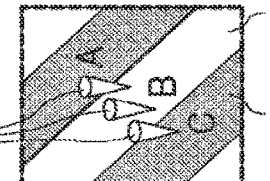
FIG. 17 is a schematic view illustrating generation of a mark left by pushing with a finger in a region surrounded by a dotted line in FIG. 16.

Generation of marks left by pushing with a finger in the conventional 4D-RTN mode liquid crystal display panel 400 is described below with reference to FIG. 16 and FIG. 17. FIG. 17 is a schematic view illustrating generation of a mark left by pushing with a finger in a region surrounded by a dotted line in FIG. 16. FIG. 17 illustrates the alignments of the liquid crystal molecules 441 in Region B which is above one slit 433 and in Boundaries A and C which are between the slit 433 and portions of the pixel electrode 431.

In the liquid crystal display panel 400, as shown in FIG. 16(a) and FIG. 16(b), the TFT substrate and the CF substrate provide different pre-tilt azimuths 453 to liquid crystal molecules so that the liquid crystal molecules are twist-aligned. In a vertical alignment mode liquid crystal display panel including pixel electrodes provided with slits, the alignment of liquid crystal molecules near the active matrix substrate (TFT substrate) depends on the balance between (1) the alignment controlling force provided by an alignment film and (2) the influence of the electric fields generated by the pixel electrodes provided with slits.

When no voltage is applied, for example, the tilt azimuth of liquid crystal molecules near the TFT substrate and the tilt azimuth of liquid crystal molecules near the CF substrate are perpendicular to each other, and liquid crystal molecules in the center portion of the liquid crystal layer in the thickness direction are aligned at an intermediate azimuth between the pre-tilt azimuth provided by the TFT substrate and the pre-tilt azimuth provided by the CF substrate. Liquid crystal molecules near the TFT substrate including the pixel electrodes provided with slits are likely to be affected by a mark left by pushing with a finger, whereas liquid crystal molecules near the CF substrate are less likely to be affected by pushing with a finger. The following description is therefore made with a focus on liquid crystal molecules near the TFT substrate and in the center portion of the liquid crystal layer in the thickness direction.

As shown in FIG. 17, when voltage is applied and the display screen is not pushed with something such as a finger (i.e., normal state), the alignment controlling force provided by an alignment film (1) is dominant. Hence, in all Regions A, B, and C, liquid crystal molecules near the TFT substrate and the CF substrate are aligned at pre-tilt azimuths T1 and C1, respectively. The liquid crystal molecules in the center portion of the liquid crystal layer in the thickness direction are aligned at an intermediate azimuth L1 between the pre-tilt azimuth provided by the TFT substrate and the pre-tilt azimuth provided by the CF substrate.

When the liquid crystal display panel is pushed with something such as a finger (i.e., upon pushing with finger), the distance between the TFT substrate and the color filter substrate (CF substrate) becomes short, and thus the influence of the electric fields generated by the pixel electrodes provided with slits (2) is dominant. Hence, in each of Regions A, B, and C, the liquid crystal molecules near the TFT substrate are aligned at an azimuth T2 by the electric fields generated by the pixel electrode 431 provided with slits, and the liquid crystal molecules in the center portion of the liquid crystal layer in the thickness direction are also aligned at an azimuth L2 under the influence of the electric fields generated by the pixel electrode 431.

Upon removal of the finger, the liquid crystal molecules near the TFT substrate in Regions A, B, and C are moved back to the alignment azimuth T1 in the normal state by the alignment controlling force provided by the alignment film. The liquid crystal molecules in the center portion of the liquid crystal layer in the thickness direction in Regions A and B are shifted from the alignment azimuth L2 upon pushing with a finger to the alignment azimuth L1 in the normal state. The liquid crystal molecules in the center portion of the liquid crystal layer in the thickness direction in Region C, however, are not shifted from the alignment azimuth L2 upon pushing with a finger to the azimuth L1 in the normal state but are aligned at a pre-tilt azimuth L3 provided by the second substrate which involves no twist and provides stable alignment. The alignment of the liquid crystal molecules in Region C is therefore irregular and Region C is observed as a mark left by pushing with a finger.

In Embodiment 1, the slits 33 are formed in a region between one pixel edge of each pixel 10 in the longitudinal direction and a center line of the pixel 10 in the transverse direction in each alignment region. With this configuration, generation of dark lines can be effectively reduced. The "center line in the transverse direction" means the line that is parallel to the longitudinal direction of the pixel 10 and passes the center point of the pixel 10 in the transverse direction.

Figure 18:
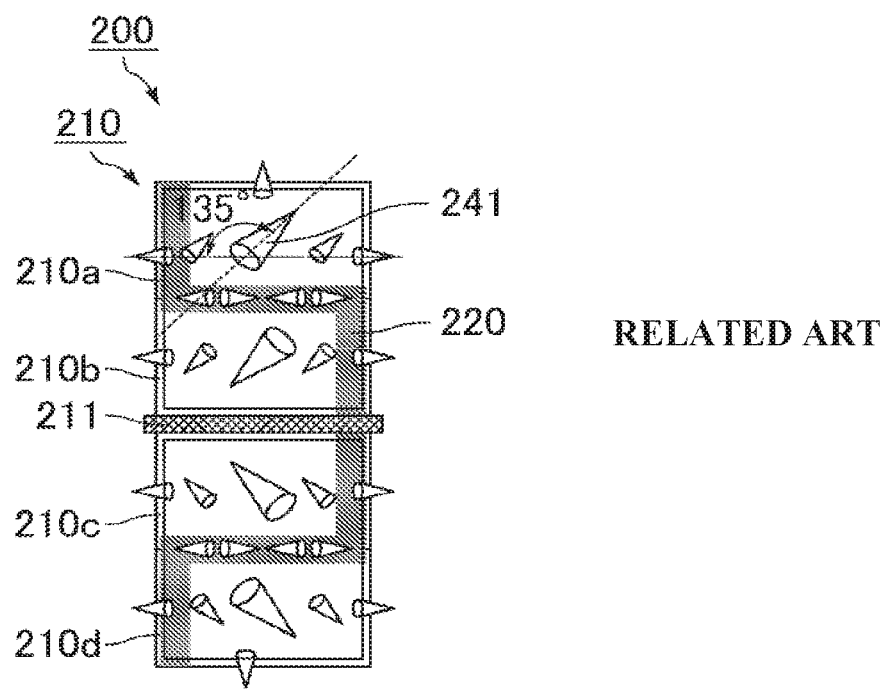
FIG. 18 is a schematic plan view of one pixel in a liquid crystal display panel including pixel electrodes each provided with no slit.
Figure 19:
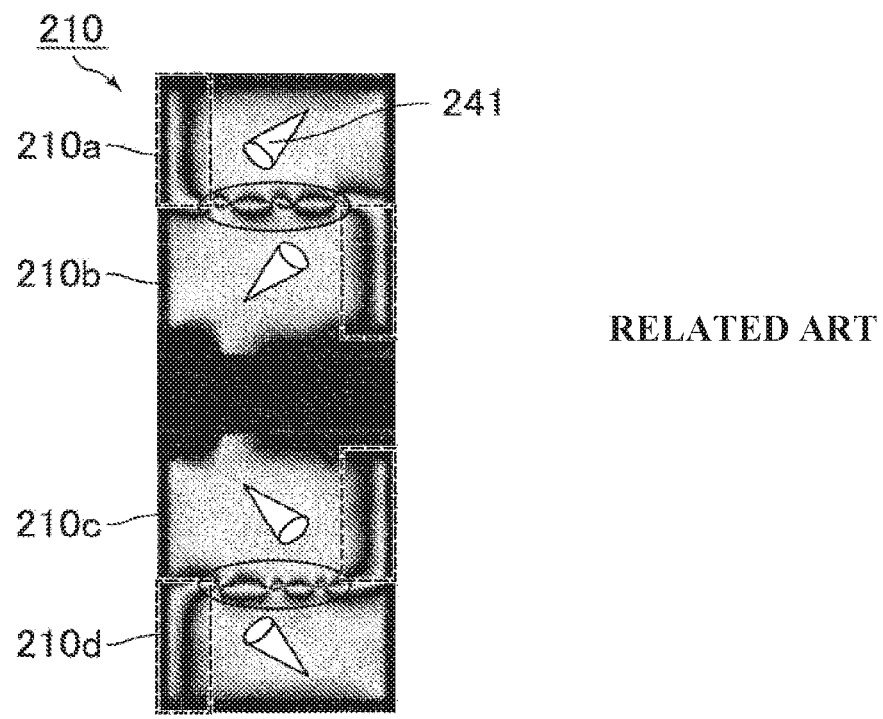
FIG. 19 is a plan view of a simulation result of liquid crystal molecule alignment distribution in the liquid crystal display panel shown in FIG. 18.

The inventors have made studies on regions observed as dark lines in order to effectively reduce generation of dark lines. Regions observed as dark lines in the case where the pixel electrodes 31 are provided with no linear slits 33 are described below with reference to FIG. 18 and FIG. 19. FIG. 18 is a schematic plan view of one pixel in a liquid crystal display panel 200 including pixel electrodes each provided with no slit. FIG. 19 is a plan view of a simulation result of liquid crystal molecule alignment distribution in the liquid crystal display panel shown in FIG. 18. FIG. 18 and FIG. 19 show the states when voltage is applied.

When voltage is applied to the liquid crystal layer, liquid crystal molecules near the outer edge of each pixel are inwardly oriented in the pixel while liquid crystal molecules near the center of the pixel are tilted at an azimuth in the alignment treatment direction. As shown in FIG. 18, for example, in a first alignment region 210a, the alignment direction of the liquid crystal molecules under the influence of the electric fields generated near the edges of the pixel electrode and the alignment direction of the liquid crystal molecules near the center of the alignment region form an angle of 135°, which is greater than 90°. In other words, the tilt azimuth of each liquid crystal molecule, extending in a direction from an end of the long axis of the liquid crystal molecule near the pixel electrodes to an end of the long axis near the counter electrode, forms an angle greater than 90° with an azimuth that is perpendicular to the longitudinal direction of the pixels and extends from exterior to interior of each pixel, upon application of voltage to the liquid crystal layer. Thus, in the region (edge portion) surrounded by a rectangle in FIG. 19, the alignment of liquid crystal molecules 241 is irregular and dark lines 220 are generated. In the liquid crystal display panel 100 of Embodiment 1, the slits 33 are formed in such regions so that generation of dark lines in the edge portions of the alignment region can be effectively reduced.

As shown in FIG. 18, two alignment regions 210a and 210b arranged next to each other provide tilt azimuths substantially 180° different from each other to the liquid crystal molecules 241. Thus, in the region (domain boundary portion) surrounded by an ellipse in FIG. 19, the alignment of the liquid crystal molecules 241 is irregular and the dark lines 220 are generated.

The slits 33 may be formed in regions superimposed on two of the alignment regions which provide tilt azimuths substantially 180° different from each other to the liquid crystal molecules 41 and are arranged next to each other such that the slits 33 face each other across a boundary between the two alignment regions. With this configuration, generation of dark lines in boundary portions between two domains arranged next to each other can be effectively reduced. More specifically, the slits 33 may be formed in regions superimposed on the alignment regions 10a and 10b such that the slits 33 face each other across the boundary between the alignment regions 10a and 10b, or the slits 33 may be formed in regions superimposed on the alignment regions 10c and 10d such that the slits 33 face each other across the boundary between the alignment regions 10c and 10d.

The slits 33 may be formed in regions superimposed on the respective alignment regions arranged next to each other in the longitudinal direction of each pixel such that the slits 33 face each other across a boundary between the alignment regions arranged next to each other. With this configuration, generation of dark lines in boundary portions between all the domains can be reduced.

With the slits 33 formed in the regions corresponding to the edge portions and/or domain boundary portions, regions with irregular alignment of liquid crystal molecules can be reduced. This improves the response performance of liquid crystal molecules and reduces the white tailing phenomenon. In addition, generation of dark lines can be limited to near the light-shielding components (e.g., source signal lines, CS lines, black matrix) which do not affect the transmittance of the liquid crystal display panel, so that the transmittance can be increased.

The slits 33 can be formed in a region not superimposed on the signal line 11, and each of the four alignment regions may include a region in which no slit is formed near the signal line 11. Also, each of the four alignment regions may be superimposed on both a region where the pixel electrode 31 is provided with the slits 33 and a region where the pixel electrode 31 is provided with no slits 33.

The slits 33 may extend parallel to the respective tilt azimuths of the liquid crystal molecules 41. This configuration causes the tilt azimuth of the liquid crystal molecules with no voltage applied to be parallel to the alignment azimuth of the liquid crystal molecules 41 under the influence of the electric fields generated by the pixel electrode 33 upon application of voltage, thereby more effectively reducing generation of marks left by pushing with a finger. The slits 33 preferably extend in the direction completely parallel to the respective tilt azimuths of the liquid crystal molecules 41, but may form an angle of, for example, 15° or smaller to the respective tilt azimuths of the liquid crystal molecules 41.

The slits 33 may each have a polygonal shape with n corners where n is an integer of 4 to 8. More specifically, the slits 33 may each have a quadrangular, pentagonal, hexagonal, heptagonal, or octagonal shape. The slits 33 may each have the same shape or different shapes at one end and the other end. Preferably, the slits 33 each have a rectangular, trapezoidal, or hexagonal shape. The ends of each slit 33 are preferably parallel to the ends of the alignment region.

Each pixel electrode 31 may exhibit L/S of 2 μm to 5 μm/5 μm to 2 μm, where L is a width of a portion of the pixel electrode 31 between the slits 33 formed next to each other and S is a width of each slit 33. The width (L) of a portion of the pixel electrode 31 and the width (S) of each slit 33 are preferably as small as possible, particularly preferably L/S=4 μm/3 μm, 3 μm/3 μm, or 2.5 μm/2.5 μm.

Each slit 33 may have a length of 10 μm to 20 μm.

Each slit 33 may be surrounded by a conductive electrode material. With the slits 33 arranged with a space from the edge of the pixel electrode 31 and surrounded by a conductive electrode material, the alignment of liquid crystal molecules is stabilized, and the regions observed as dark lines can be fixed to the edge of the pixel 10. This configuration can also prevent breaking of the pixel electrodes 31 and thus increase the production yield. The distance from the outer edge of the pixel electrode 31 to an end of each slit 33 may be 2 μm to 10 μm.

The second substrate 50 includes the counter electrode 51, and may be, for example, a color filter substrate (CF substrate). The color filter substrate can be one commonly used in the field of liquid crystal display panels.

The color filter substrate may have a configuration including, on a transparent substrate, components such as a black matrix formed in a grid pattern and color filters formed inside the grids, i.e., pixels. The black matrix may include a grid for each pixel such that the grid is superimposed on the boundaries of the pixels, and may also include a grid for each half pixel such that the grid crosses the center of the pixel in the transverse direction. A black matrix formed to be superimposed on dark line regions can reduce the chances of dark line observation. The counter electrode 51 is arranged to face the pixel electrodes 31 across the liquid crystal layer 40. Vertical electric fields are generated between the counter electrode 51 and the pixel electrodes 31, so that the liquid crystal molecules 41 are tilted to provide display. Color filters may be arranged in the order of red (R), green (G), and blue (B), in the order of yellow (Y), red (R), green (G), and blue (B), or in the order of red (R), green (G), blue (B), and green (G) in each column, for example.

The counter electrode 51 is preferably a planar electrode. The counter electrode 51 may be a transparent electrode, and can be formed of, for example, a transparent conductive material such as indium tin oxide (ITO), indium zinc oxide (IZO), zinc oxide (ZnO), or tin oxide (SnO), or an alloy thereof.

The liquid crystal display panel 100 may include the first vertical alignment film 70 between the liquid crystal layer 40 and the pixel electrodes 31 and the second vertical alignment film 80 between the liquid crystal layer 40 and the counter electrode 51. The first vertical alignment film 70 and the second vertical alignment film 80 each have a function of controlling the alignment of the liquid crystal molecules 41 in the liquid crystal layer 40. When the voltage applied to the liquid crystal layer 40 is lower than the threshold voltage (including the case of no voltage application), the liquid crystal molecules 41 are aligned in the direction substantially perpendicular to the first vertical alignment film 70 and the second vertical alignment film 80 and at a tilt in the respective tilt azimuth directions by the functions of the first vertical alignment film 70 and the second vertical alignment film 80. Specifically, the first vertical alignment film 70 can align the liquid crystal molecules at 85.0° to 89.0° relative to the first substrate 30, for example, while the second vertical alignment film 80 can align the liquid crystal molecules at 85.0° to 89.0° relative to the second substrate 50, for example.

For example, in each of the four alignment regions 10a, 10b, 10c, and 10d in a plan view of the liquid crystal display panel 100, the first vertical alignment film 70 and the second vertical alignment film 80 are set to provide pre-tilt azimuths opposite to each other and form an angle of 45° or smaller. The four alignment regions 10a, 10b, 10c, and 10d can thereby provide different tilt azimuths to the liquid crystal molecules 41. More preferably, the first vertical alignment film 70 and the second vertical alignment film 80 provide pre-tilt azimuths opposite to each other and parallel to each other. In this case, the first vertical alignment film 70 and the second vertical alignment film 80 provide pre-tilt azimuths substantially 180° different from each other. For example, in the case where the first alignment region 10a provides a tilt azimuth of substantially 225° to the liquid crystal molecules 41, the first vertical alignment film 70 is set to provide a pre-tilt azimuth of substantially 225° and the second vertical alignment film 80 is set to provide a pre-tilt azimuth of substantially 45°. Here, the pre-tilt azimuth provided by the first vertical alignment film 70 is an azimuth at which the liquid crystal molecules 41 are tilted relative to the first vertical alignment film 70 when no voltage is applied to the liquid crystal layer.

The pre-tilt azimuth provided by the second vertical alignment film 80 is an azimuth at which the liquid crystal molecules 41 are tilted relative to the second vertical alignment film 80 when no voltage is applied to the liquid crystal layer.

The first vertical alignment film 70 and the second vertical alignment film 80 may be photo-alignment films formed of a photo-alignment material. The photo-alignment material encompasses general materials that undergo structural change when irradiated with light (electromagnetic waves) such as ultraviolet light or visible light, and thereby exhibit an ability of controlling the alignment of the nearby liquid crystal molecules (alignment controlling force) or change the alignment controlling force level and/or direction. Examples of the photo-alignment material include those containing a photo-reactive site which undergoes a reaction such as dimerization (formation of dimers), isomerization, photo-Fries rearrangement, or decomposition when irradiated with light. Examples of the photo-reactive site (functional group) which is dimerized and isomerized when irradiated with light include cinnamate, 4-chalcone, 4'-chalcone, coumarin, and stilbene. Examples of the photo-reactive site (functional group) which is isomerized when irradiated with light include azobenzene. Examples of the photo-reactive site which is photo-Fries rearranged when irradiated with light include phenolic ester structures. Examples of the photo-reactive site which is decomposed when irradiated with light include cyclobutane structures.

The first vertical alignment film 70 and the second vertical alignment film 80 can, upon being subjected to photo-alignment treatment, provide a pre-tilt angle to the liquid crystal molecules 41. The photo-alignment treatment can be performed by irradiating the first substrate 30 provided with the first vertical alignment film 70 on a surface and the second substrate 50 provided with the second vertical alignment film 80 on a surface with light from a light source.

A first polarizing plate 20 may be formed on or adjacent to the surface of the first substrate 30 opposite to the liquid crystal layer 40, and a second polarizing plate 60 may be formed on or adjacent to the surface of the second substrate 50 opposite to the liquid crystal layer 40. The polarization axis of the first polarizing plate 20 and the polarization axis of the second polarizing plate 60 may be perpendicular to each other. For example, the first polarizing plate 20 and the second polarizing plate 60 may be arranged such that one of the polarization axes is parallel to the long sides of the pixels 10 and the other polarization axis is perpendicular to the long sides of the pixels 10. Here, the polarization axis may be an absorption axis or a transmission axis of a polarizing plate. Typical examples of the first polarizing plate 20 and the second polarizing plate 60 include those obtained by adsorbing a dichroic anisotropic material such as an iodine complex on a polyvinyl alcohol (PVA) film and aligning the material. Typically, each surface of a PVA film is laminated with a protective film such as a triacetyl cellulose film for practical use. An optical film such as a retardation film may be arranged between the first polarizing plate 20 and the first substrate 30 or between the second polarizing plate 60 and the second substrate 50.

In the liquid crystal display panel 100 of Embodiment 1, typically, the first substrate 30 and the second substrate 50 are bonded to each other by the sealing material 90 provided to surround the liquid crystal layer 40, so that the liquid crystal layer 40 is held in a predetermined region. The sealing material 90 may be, for example, an epoxy resin containing an inorganic or organic filler and a curing agent.

The liquid crystal display panel 100 of Embodiment 1 may be a liquid crystal display device including a backlight at the backside. A liquid crystal display device having such a configuration is typically called a transmissive liquid crystal display device. The backlight may be any backlight that emits light including only visible light or light including both visible light and ultraviolet light. In order to provide color display on the liquid crystal display device, a backlight emitting white light is suitable. Suitable kinds of the backlight include light emitting diodes (LEDs). The "visible light" as used herein means light (electromagnetic waves) having a wavelength of 380 nm or longer but shorter than 800 nm.

The liquid crystal display device has a configuration including, as well as the liquid crystal display panel and the backlight, multiple components including external circuits such as a tape-carrier package (TCP) and a printed circuit board (PCB); optical films such as a viewing angle-increasing film and a luminance-increasing film; and a bezel (frame). Some components, if appropriate, may be incorporated into another component. Components other than those described above are not particularly limited and are not described here because such components can be those commonly used in the field of liquid crystal display devices. A mark is less likely to be left by pushing with a finger on the liquid crystal display panel of Embodiment 1, and thus the liquid crystal display panel is suitable for touch panels whose display screen is touched with something such as a finger or stylus to give input.

Hereinafter, Modified Embodiments 1 to 4 are described in each of which the slit arrangement in Embodiment 1 was changed.

Modified Embodiment 1

Figure 7:
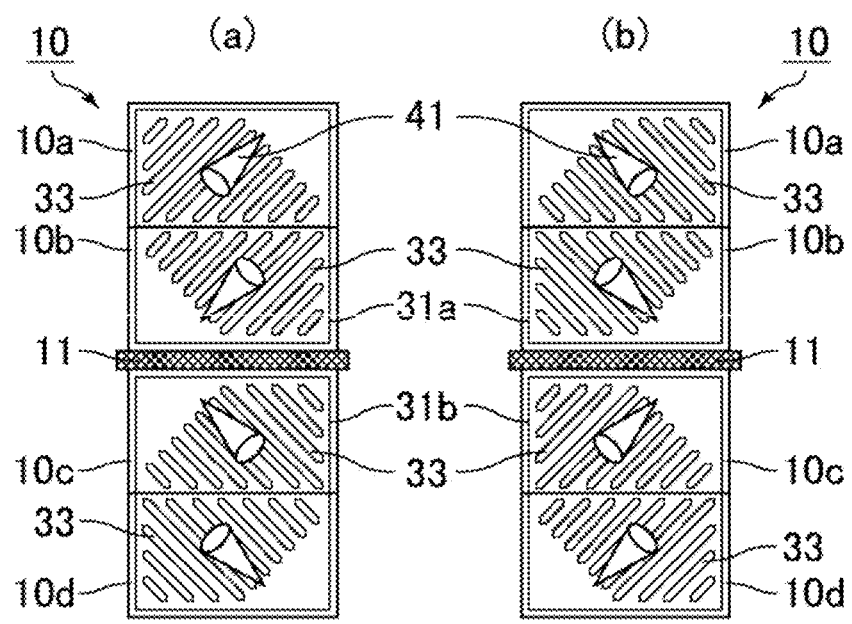
FIG. 7 shows schematic plan views of one pixel in a liquid crystal display panel of Modified Embodiment 1.

In Modified Embodiment 1, the slits 33 further extend to the center of each alignment region in a plan view. FIG. 7 shows schematic plan views of one pixel in a liquid crystal display panel of Modified Embodiment 1. FIG. 7(a) shows the case where the alignment division pattern is the first alignment division pattern. FIG. 7(b) shows the case where the alignment division pattern is the second alignment division pattern. With the further extended slits 33, the alignment of the liquid crystal molecules in the center portion of each alignment region can be controlled and the luminance can be increased in addition to reducing dark lines in the edge portions and domain boundary portions.

Modified Embodiment 2

In Modified Embodiment 2, in each alignment region, the slits 33 are formed inside the pixel electrode along an outer periphery of the alignment region. FIG. 8 shows schematic plan views of one pixel in a liquid crystal display panel of Modified Embodiment 2. FIG. 8(a) shows the case where the alignment division pattern is the first alignment division pattern. FIG. 8(b) shows the case where the alignment division pattern is the second alignment division pattern. In Modified Embodiment 2, the alignment of the liquid crystal molecules around each alignment region can be controlled and the luminance can be increased in addition to reducing dark lines in the edge portions and domain boundary portions.

Modified Embodiment 3

In Modified Embodiment 3, in each alignment region, the slits 33 are formed in the entire region superimposed on the alignment region. FIG. 9 shows schematic plan views of one pixel in a liquid crystal display panel of Modified Embodiment 3. FIG. 9(a) shows the case where the alignment division pattern is the first alignment division pattern. FIG. 9(b) shows the case where the alignment division pattern is the second alignment division pattern. The region where the slits 33 are formed and the alignment region may not be completely the same as each other. For example, the slits 33 are each preferably surrounded by a conductive electrode material. In this case, since the ends of the slits 33 are connected by a conductive electrode material, the area of the region where the slits 33 are formed is smaller than the area of the alignment region. Also, in the region where components such as the TFTs are arranged, the slits 33 may not be formed. In Modified Embodiment 3, the alignment of the liquid crystal molecules in one entire alignment region can be controlled and the luminance can be increased in addition to reducing dark lines in the edge portions and domain boundary portions.

Modified Embodiment 4

Figure 10:
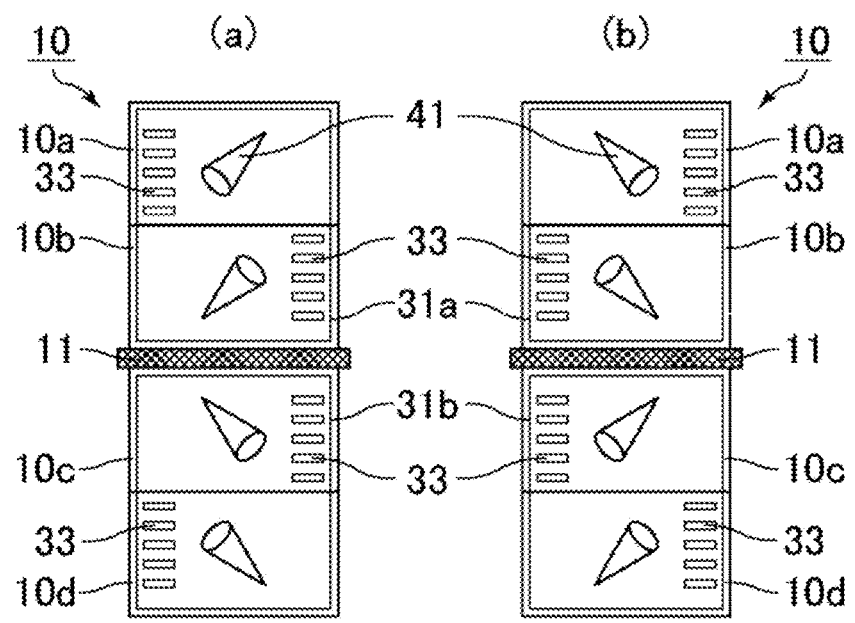
FIG. 10 shows schematic plan views of one pixel in a liquid crystal display panel of Modified Embodiment 4.

In Modified Embodiment 4, the slits 33 extend in the direction forming an angle of substantially 45° with the respective tilt azimuths of the liquid crystal molecules. FIG. 10 shows schematic plan views of one pixel in a liquid crystal display panel of Modified Embodiment 4. FIG. 10(a) shows the case where the alignment division pattern is the first alignment division pattern. FIG. 10(b) shows the case where the alignment division pattern is the second alignment division pattern. In Modified Embodiment 4, the slits 33 are each preferably formed in a region between one pixel edge of each pixel in the longitudinal direction and a center line of the pixel in the transverse direction in each alignment region. With this configuration, generation of dark lines in the edge portions can be reduced.

Hereinabove, embodiments of the present invention have been described. Each and every detail described for the above embodiments of the present invention should be applied to all the aspects of the present invention.

The present invention is described in more detail below based on examples and comparative examples. The present invention, however, is not limited to these examples.

Example 1

A liquid crystal display panel of Example 1 is Specific Example 1 of the liquid crystal display panel of Embodiment 1 and has the following configuration.

The liquid crystal display panel of Example 1 included, as shown in FIG. 6(a), a first alignment region providing a tilt azimuth of substantially 225°, a second alignment region providing a tilt azimuth of substantially 45°, a third alignment region providing a tilt azimuth of substantially 315°, and a fourth alignment region providing a tilt azimuth of substantially 135° in the longitudinal direction of the pixels. Pixel electrodes were each provided with slits. The slits were formed in a region between one pixel edge of each pixel in the longitudinal direction and a center line of the pixel in the transverse direction in each alignment region. The slits were formed in regions superimposed on the first alignment region and the second alignment region such that the slits face each other across the boundary between the first alignment region and the second alignment region. Also, the slits were formed in regions superimposed on the third alignment region and the fourth alignment region such that the slits face each other across the boundary between the third alignment region and the fourth alignment region. The slits extend in the direction parallel to the respective tilt azimuths of the liquid crystal molecules. Each slit had a rectangular shape and a length of 10 μm. The portions of each pixel electrode between slits formed next to each other each had a width (L) of 4 μm and each slit had a width (S) of 3 μm.

The liquid crystal display panel of Example 1 reduced generation of dark lines in the edge portions and the domain boundary portions. Also, no mark was left by pushing with a finger when the display screen (which was provided adjacent to the second polarizing plate 60 in FIG. 1) in the liquid crystal display panel of Example 1 was pushed with a finger for three seconds, with the finger run linearly on the screen, and three seconds later, whether or not a mark was left by pushing with the finger was determined.

Example 2

A liquid crystal display panel of Example 2 is a specific example of the liquid crystal display panel of Modified Embodiment 1 and has the following configuration. The liquid crystal display panel of Example 2 has the configuration shown in FIG. 7(*a*) and is similar to the liquid crystal display panel of Example 1 except that the slits extend to the center of the corresponding alignment region and each slit has a hexagonal shape. In the liquid crystal display panel of Example 2, no mark left by pushing with a finger was observed after pushing the display screen with a finger as in Example 1.

Example 3

A liquid crystal display panel of Example 3 is Specific Example 2 of the liquid crystal display panel of Embodiment 1 and has a configuration similar to that of the liquid crystal display panel of Example 1 except that the slit shape was changed. In the liquid crystal display panel of Example 3, each slit has a trapezoidal shape and the ends of each slit are parallel to the ends of the corresponding alignment region. In the liquid crystal display panel of Example 3, no mark left by pushing with a finger was observed after pushing the display screen with a finger as in Example 1.

Example 4

A liquid crystal display panel of Example 4 is Specific Example 3 of the liquid crystal display panel of Embodiment 1 and has a configuration similar to that of the liquid crystal display panel of Example 1 except that the slit shape was changed. In a liquid crystal display panel 100C of Example 3, each slit has a hexagonal shape and the ends of each slit are parallel to the ends of the corresponding alignment region. In the liquid crystal display panel of Example 4, no mark left by pushing with a finger was observed after pushing the display screen with a finger as in Example 1.

Comparative Example 1

Figure 11:
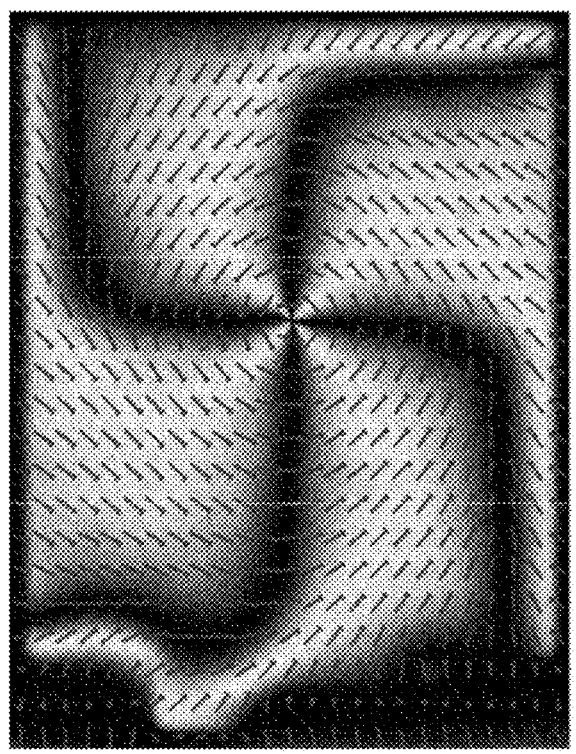
FIG. 11 is a plan view showing a simulation result of liquid crystal molecule alignment distribution in a half pixel in Comparative Example 1.
Figure 15:
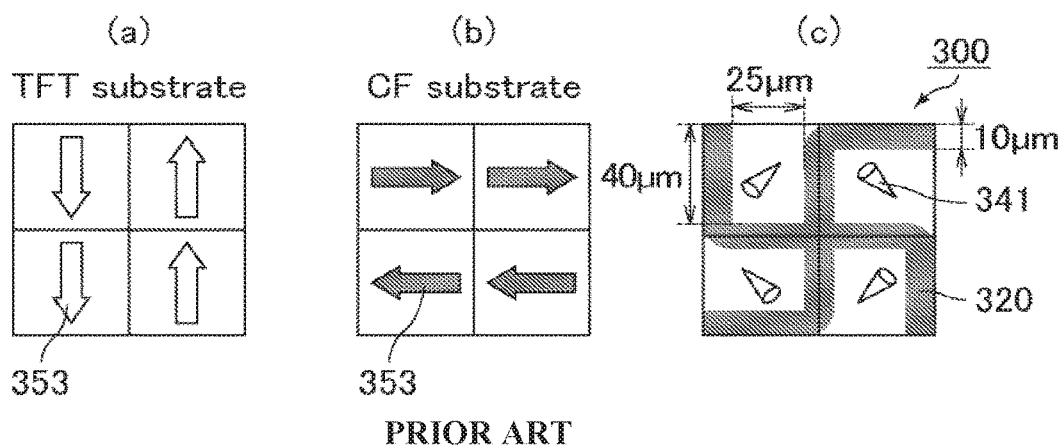
FIG. 15 shows schematic plan views of a half pixel in a conventional 4D-RTN mode liquid crystal display panel.

A liquid crystal display panel of Comparative Example 1 is a specific example of the conventional 4D-RTN liquid crystal display panel 300 and has the same configuration as shown in FIG. 15. In the liquid crystal display panel of Comparative Example 1, each half pixel includes four alignment regions of two rows by two columns, and the pre-tilt azimuths of the liquid crystal molecules relative to the TFT substrate are perpendicular to the pre-tilt azimuths of the liquid crystal molecules relative to the CF substrate in each alignment region. Also, the pixel electrodes are provided with no slits. FIG. 11 is a plan view showing a simulation result of liquid crystal molecule alignment distribution in a half pixel in Comparative Example 1. As shown in FIG. 11, the alignment of the liquid crystal molecules was irregular near the outer edge of each pixel, and in the boundary portions between the alignment regions and dark lines were generated.

Comparison Between Examples and Comparative Example (Transmittance Increasing Effect)

The performance of each of the liquid crystal display panels of Example 1, Example 2, and Comparative Example 1 was simulated with the size of one pixel set to the size in a 85-inch (8k4k) display panel. The results are shown in FIG. 12. FIG. 12 is a table showing comparison of transmittance among the liquid crystal display panels of Example 1, Example 2, and Comparative Example 1. In FIG. 12, "With CS-connecting lines" indicates the cases where CS-connecting lines CS3 shown in FIG. 3 were formed in the first substrate, while "Without CS-connecting lines" indicates the cases where no CS-connecting lines CS3 were formed in the first substrate.

FIG. 12 shows that the liquid crystal display panel of Example 1 had a transmittance of 122% with the CS-connecting lines and a transmittance of 126% without the CS-connecting lines, with the transmittance of a conventional 4D-RTN mode liquid crystal display panel taken as 100%, meaning that the transmittance was increased. The liquid crystal display panel of Example 2 also had a transmittance of 130% with the CS-connecting lines and a transmittance of 134% without the CS-connecting lines, which are even higher than the transmittances obtained in Example 1. This is presumably because the luminance was also increased in regions other than the edge portions and the domain boundary portions by extending the slits to the center of the corresponding alignment region. The transmittance is therefore expected to be highest when, in each alignment region, the slits are formed in the entire region superimposed on the alignment region as shown in FIG. 9.

(White Tailing Phenomenon Reducing Effect)

Figure 13:
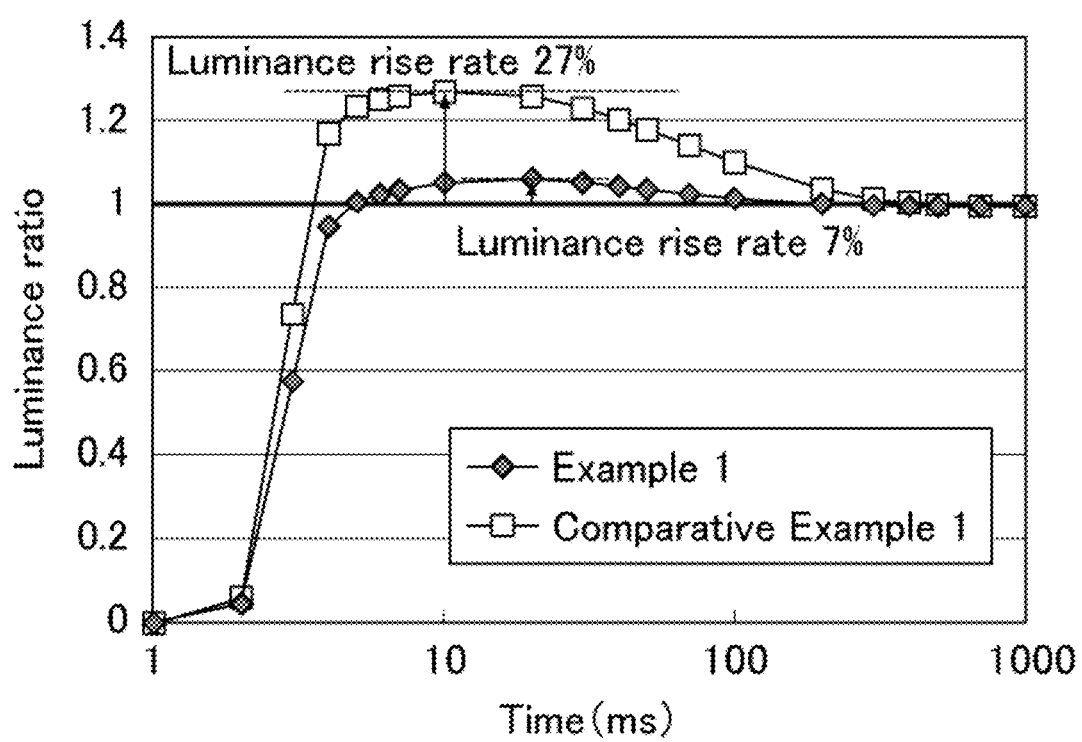
FIG. 13 is a graph showing comparison of luminance rise rate between the liquid crystal display panels of Example 1 and Comparative Example 1.

The luminance rise rates in Example 1 and Comparative Example 1 were compared to see the white tailing phenomenon reducing effect. The luminance rise rate is the maximum luminance in rise time relative to the luminance in the normal state, with the luminance in the normal state in a liquid crystal display panel taken as 1. A higher luminance rise rate means a higher probability of observing a white tailing phenomenon. The results are shown in FIG. 13. FIG. 13 is a graph showing comparison of luminance rise rate between the liquid crystal display panels of Example 1 and Comparative Example 1. The horizontal axis shows time (mn) and the vertical axis shows the luminance ratio. In FIG. 13, the luminance measured 1000 ms after the driving was taken as the luminance in the normal state.

FIG. 13 shows that the luminance rise rate in Example 1 was 7% and is therefore reduced from the 27% of the conventional 4D-RTN mode liquid crystal display panel. The results show that the white tailing phenomenon was reduced in Example 1.

(Comparison of Dark Line Width)

Figure 14:
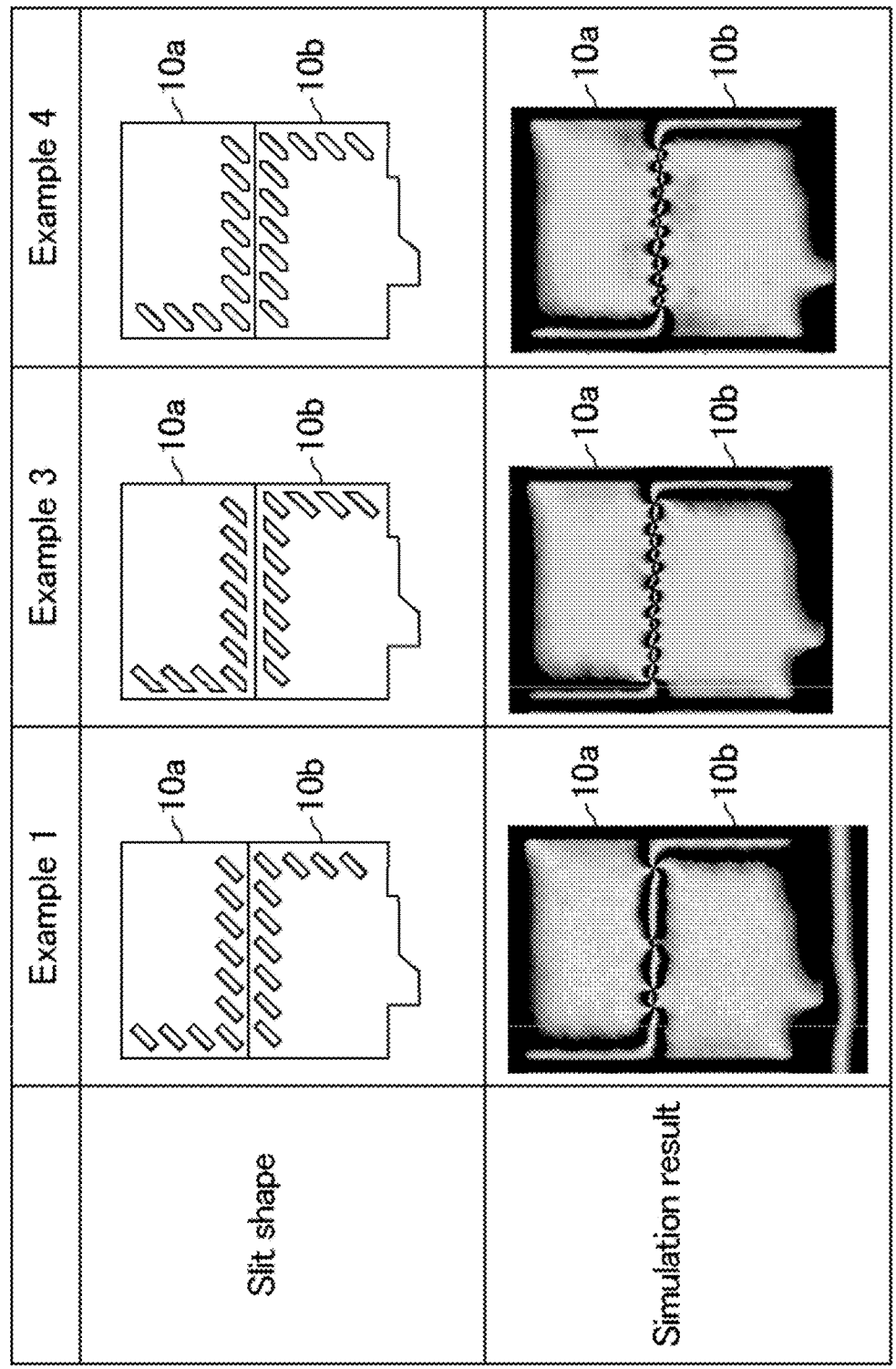
FIG. 14 is a table showing comparison of simulation results of liquid crystal molecule alignment distribution in the liquid crystal display panels of Example 1, Example 3, and Example 4.

The regions observed as dark lines were compared based on the simulation results of the liquid crystal display panels of Example 1, Example 3, and Example 4. FIG. 14 is a table showing comparison of simulation results of liquid crystal molecule alignment distribution in the liquid crystal display panels of Example 1, Example 3, and Example 4. FIG. 14 shows that when the ends of each slit are parallel to the ends of the corresponding alignment region and each slit has a polygonal shape such as a trapezoidal shape or a hexagonal shape, dark lines can be further reduced in the domain boundary portions and dark lines can be limited to a narrower region in the boundary between two alignment regions.

Additional Remarks

One aspect of the present invention may be a liquid crystal display panel including in the following order: a first substrate including pixel electrodes; a liquid crystal layer containing liquid crystal molecules; and a second substrate including a counter electrode, the liquid crystal display panel including pixels each including at least four alignment regions of a first alignment region, a second alignment region, a third alignment region, and a fourth alignment region that provide different tilt azimuths to the liquid crystal molecules, the four alignment regions being arranged in a longitudinal direction of the pixels, the pixel electrodes being arranged in the respective pixels and each provided with linear slits formed to be superimposed on at least one of the four alignment regions, the slits being formed in a region between one pixel edge of each pixel in the longitudinal direction and a center line of the pixel in the transverse direction in each alignment region, the liquid crystal molecules being aligned in a direction substantially perpendicular to the first substrate and the second substrate and at a tilt in the respective tilt azimuth directions with no voltage applied to the liquid crystal layer, the liquid crystal molecules being at a twist angle of substantially 45° or smaller in each of the four alignment regions in a plan view of the liquid crystal display panel, upon application of voltage to the liquid crystal layer, the liquid crystal molecules being to be more tilted in the respective tilt azimuth directions and the tilt azimuth of each liquid crystal molecule, extending in a direction from an end of the long axis of the liquid crystal molecule near the pixel electrodes to an end of the long axis near the counter electrode, forming an angle greater than 90° with an azimuth that is perpendicular to the longitudinal direction of the pixels and extends from exterior to interior of each pixel, in each region in which the slits are formed.

The first alignment region, the second alignment region, the third alignment region, and the fourth alignment region may each be any of an alignment region providing a tilt azimuth of substantially 45°, an alignment region providing a tilt azimuth of substantially 135°, an alignment region providing a tilt azimuth of substantially 225°, and an alignment region providing a tilt azimuth of substantially 315°, with the azimuth in a transverse direction of the pixels being defined as 0°.

The four alignment regions may include two alignment regions which provide tilt azimuths substantially 180° different from each other to the liquid crystal molecules and are arranged next to each other.

Each pixel may have a first alignment division pattern in which the first alignment region providing a tilt azimuth of substantially 225°, the second alignment region providing a tilt azimuth of substantially 45°, the third alignment region providing a tilt azimuth of substantially 315°, and the fourth alignment region providing a tilt azimuth of substantially 135° are arranged in the given order, or a second alignment division pattern in which the first alignment region providing a tilt azimuth of substantially 315°, the second alignment region providing a tilt azimuth of a substantially 135°, the third alignment region providing a tilt azimuth of substantially 225°, and the fourth alignment region providing a tilt azimuth of substantially 45° are arranged in the given order.

The slits may extend parallel to the respective tilt azimuths of the liquid crystal molecules.

The slits may be formed in regions superimposed on two of the alignment regions which provide tilt azimuths substantially 180° different from each other to the liquid crystal molecules and are arranged next to each other such that the slits face each other across a boundary between the two alignment regions.

The slits may be formed in regions superimposed on the respective alignment regions arranged next to each other in the longitudinal direction of each pixel such that the slits face each other across a boundary between the alignment regions arranged next to each other.

The slits may further extend to the center of each alignment region in a plan view.

In each alignment region, the slits may be formed inside the pixel electrode along an outer periphery of the alignment region.

In each alignment region, the slits may be formed in the entire region superimposed on the alignment region.

The slits may extend in a direction forming an angle of substantially 45° with the respective tilt azimuths of the liquid crystal molecules.

The slits may each have a length of 10 μm to 20 μm.

The slits may each be surrounded by a conductive electrode material.

The slits may each have a polygonal shape with n corners where n is an integer of 4 to 8.

The slits may each have a rectangular shape.

The slits may each have a trapezoidal shape.

The slits may each have a hexagonal shape.

Each pixel electrode may exhibit L/S of 2 μm to 5 μm/5 μm to 2 μm, where L is a width of a portion of the pixel electrode between the slits formed next to each other and S is a width of each slit.

A distance from an outer edge of each pixel electrode to an end of each slit formed in the pixel electrode may be 2 μm to 10 μm.

An end of each slit may be parallel to an end of the corresponding alignment region.

The pixel electrodes may each include a first pixel electrode configured to apply voltage to two alignment regions arranged next to each other among the four alignment regions and a second pixel electrode configured to apply voltage to the other two alignment regions arranged next to each other, and the first pixel electrode and the second pixel electrode are configured to apply different voltages to the liquid crystal layer.

The features of the present invention described above may appropriately be combined within the spirit of the present invention.

REFERENCE SIGNS LIST

10, 210: pixel
10a, 10b, 10c, 10d, 210a, 210b, 210c, 210d: alignment region
11, 211: signal line (gate signal line)

13a, 13b, 13c: TFT
20: first polarizing plate
30: first substrate
31, 431: pixel electrode
31a: first pixel electrode
31b: second pixel electrode
33, 433: slit
40: liquid crystal layer
41, 241, 341, 441: liquid crystal molecule
50: second substrate
51: counter electrode
60: second polarizing plate
70: first vertical alignment film
80: second vertical alignment film
90: sealing material
100, 200, 300, 400: liquid crystal display panel
220, 320, 420: dark line
353, 453: pre-tilt azimuth of liquid crystal molecule

The invention claimed is:

1. A liquid crystal display panel comprising in the following order:
a first substrate including pixel electrodes; a liquid crystal layer containing liquid crystal molecules; and a second substrate including a counter electrode;
the liquid crystal display panel including pixels each including at least four alignment regions of a first alignment region, a second alignment region, a third alignment region, and a fourth alignment region that provide different tilt azimuths to the liquid crystal molecules, the four alignment regions being arranged in a longitudinal direction of the pixels, the pixel electrodes being arranged in the respective pixels and each provided with linear slits formed to be superimposed on at least one of the four alignment regions,
the slits being formed in a region between one pixel edge of each pixel in the longitudinal direction and a center line of the pixel that is parallel to the longitudinal direction in each alignment region,
the liquid crystal molecules being aligned in a direction substantially perpendicular to the first substrate and the second substrate and at a tilt in the respective tilt azimuth directions with no voltage applied to the liquid crystal layer,
the liquid crystal molecules being at a twist angle of substantially 45° or smaller in each of the four alignment regions in a plan view of the liquid crystal display panel,
upon application of voltage to the liquid crystal layer, the liquid crystal molecules being to be more tilted in the respective tilt azimuth directions,
the slits are each full surrounded by a conductive electrode material.

2. The liquid crystal display panel according to claim 1, wherein the first alignment region, the second alignment region, the third alignment region, and the fourth alignment region are each any of an alignment region providing a tilt azimuth of substantially 45°, an alignment region providing a tilt azimuth of substantially 135°, an alignment region providing a tilt azimuth of substantially 225°, and an alignment region providing a tilt azimuth of substantially 315°, with the azimuth in a transverse direction of the pixels being defined as 0°.

3. The liquid crystal display panel according to claim 1, wherein the four alignment regions include two alignment regions which provide tilt azimuths substantially 180° different from each other to the liquid crystal molecules and are arranged next to each other.

4. The liquid crystal display panel according to claim 1, wherein each pixel has a first alignment division pattern in which the first alignment region providing a tilt azimuth of substantially 225°, the second alignment region providing a tilt azimuth of substantially 45°, the third alignment region providing a tilt azimuth of substantially 315°, and the fourth alignment region providing a tilt azimuth of substantially 135° are arranged in the given order, or a second alignment division pattern in which the first alignment region providing a tilt azimuth of substantially 315°, the second alignment region providing a tilt azimuth of a substantially 135°, the third alignment region providing a tilt azimuth of substantially 225°, and the fourth alignment region providing a tilt azimuth of substantially 45° are arranged in the given order.

5. The liquid crystal display panel according to claim 1, wherein the slits extend parallel to the respective tilt azimuths of the liquid crystal molecules.

6. The liquid crystal display panel according to claim 5, wherein the slits are formed in regions superimposed on two of the alignment regions which provide tilt azimuths substantially 180° different from each other to the liquid crystal molecules and are arranged next to each other such that the slits face each other across a boundary between the two alignment regions.

7. The liquid crystal display panel according to claim 5, wherein the slits are formed in regions superimposed on the respective alignment regions arranged next to each other in the longitudinal direction of each pixel such that the slits face each other across a boundary between the alignment regions arranged next to each other.

8. The liquid crystal display panel according to claim 5, wherein the slits further extend to the center of each alignment region in a plan view.

9. The liquid crystal display panel according to claim 5, wherein in each alignment region, the slits are formed inside the pixel electrode along an outer periphery of the alignment region.

10. The liquid crystal display panel according to claim 5, wherein in each alignment region, the slits are formed in the entire region superimposed on the alignment region.

11. The liquid crystal display panel according to claim 1, wherein the slits extend in a direction forming an angle of substantially 45° with the respective tilt azimuths of the liquid crystal molecules.

12. The liquid crystal display panel according to claim 1, wherein the slits each have a polygonal shape with n corners where n is an integer of 4 to 8.

13. The liquid crystal display panel according to claim 12, wherein the slits each have a rectangular shape.

14. The liquid crystal display panel according to claim 12, wherein the slits each have a trapezoidal shape.

15. The liquid crystal display panel according to claim 12, wherein the slits each have a hexagonal shape.

16. The liquid crystal display panel according to claim 1, wherein each pixel electrode exhibits L/S of 2 μm to 5 μm/5 μm to 2 μm, where L is a width of a portion of the pixel electrode between the slits formed next to each other and S is a width of each slit.

17. The liquid crystal display panel according to claim 1, wherein a distance from an outer edge of each pixel electrode to an end of each slit formed in the pixel electrode is 2 μm to 10 μm.

18. The liquid crystal display panel according to claim 1, wherein an end of each slit is parallel to an end of the corresponding alignment region.

19. The liquid crystal display panel according to claim 1, wherein the pixel electrodes each include a first pixel electrode configured to apply voltage to two alignment regions arranged next to each other among the four alignment regions and a second pixel electrode configured to apply voltage to the other two alignment regions arranged next to each other, and the first pixel electrode and the second pixel electrode are configured to apply different voltages to the liquid crystal layer.

* * * * *